(12) United States Patent
Yamanaka

(10) Patent No.: US 11,789,248 B2
(45) Date of Patent: Oct. 17, 2023

(54) ZOOM LENS AND IMAGING APPARATUS

(71) Applicant: TAMRON CO., LTD., Saitama (JP)

(72) Inventor: Hisayuki Yamanaka, Saitama (JP)

(73) Assignee: TAMRON CO., LTD., Saitama (JP)

( * ) Notice: Subject to any disclaimer, the term of this patent is extended or adjusted under 35 U.S.C. 154(b) by 94 days.

(21) Appl. No.: 17/476,111

(22) Filed: Sep. 15, 2021

(65) Prior Publication Data

US 2022/0196996 A1   Jun. 23, 2022

(30) Foreign Application Priority Data

Dec. 17, 2020 (JP) ................. 2020-208971

(51) Int. Cl.
*G02B 15/14* (2006.01)
*G02B 15/22* (2006.01)

(52) U.S. Cl.
CPC ..... *G02B 15/145121* (2019.08); *G02B 15/22* (2013.01)

(58) Field of Classification Search
CPC .................. G02B 15/145121; G02B 15/22
See application file for complete search history.

(56) References Cited

U.S. PATENT DOCUMENTS

| 9,715,125 B2 | 7/2017 | Obikane |
| 10,571,670 B2 | 2/2020 | Sugita |
| 2012/0242887 A1* | 9/2012 | Matsumura .... G02B 15/145121 359/557 |
| 2016/0109692 A1* | 4/2016 | Shibata .......... G02B 15/145121 359/557 |
| 2019/0056573 A1* | 2/2019 | Masugi .......... G02B 15/145121 |

FOREIGN PATENT DOCUMENTS

| JP | 2014-228812 A | 12/2014 |
| JP | 2018-159822 A | 10/2018 |

* cited by examiner

*Primary Examiner* — George G. King
(74) *Attorney, Agent, or Firm* — Paratus Law Group, PLLC

(57) ABSTRACT

Provided are a zoom lens comprising, in order from an object side, a first lens group having positive refractive power, a second lens group having negative refractive power, a third lens group having positive refractive power, a fourth lens group having negative refractive power, and a fifth lens group having positive refractive power, in which distances between the respective lens groups are changed to change magnification, the first lens group consists of one single lens having spherical surfaces on both sides, the single lens is a positive meniscus lens having a convex shape toward the object side, at a time of magnification change from a wide-angle end to a telephoto end, the second lens group moves along a path convex toward the image side, and a predetermined conditional expression is satisfied, and an imaging apparatus including the zoom lens.

13 Claims, 16 Drawing Sheets

ZOOM LENS AND IMAGING APPARATUS

CROSS-REFERENCE TO RELATED APPLICATIONS

This application is based on and claims the benefit of priority from Japanese Patent Application No. 2020-208971, filed on Dec. 17, 2020, the entire contents of which are incorporated herein by reference.

BACKGROUND OF THE INVENTION

Technical Field

The present invention relates to a zoom lens and an imaging apparatus.

Related Art

Imaging apparatuses using solid-state image sensors such as digital still cameras and digital video cameras have been widely used. Examples of such an imaging apparatus include various apparatuses such as a digital still camera, a digital video camera, a broadcast camera, a surveillance camera, and an in-vehicle camera. In any imaging apparatus, high functionality and high performance have been advanced. In addition, in an imaging optical system of these imaging apparatuses, a zoom lens having a wide angle of view and a high magnification ratio is required.

As a zoom lens, for example, a positive-lead type configuration including a lens group having positive refractive power closest to an object side is known. In a positive-lead zoom lens, a second lens group, which is mainly second from the object side, has strong negative refractive power. The second lens group is caused to bear a large variable magnification burden, so that it is easy to achieve high variable magnification. Further, in the positive-lead zoom lens, it is easy to enhance a telephoto property, and it is easy to shorten a total length.

In addition, as a zoom lens, a negative lead type configuration including a lens group having negative refractive power closest to the object side is also known. In the negative-lead zoom lens, the second lens group, which is mainly second from the object side, has positive refractive power. The second lens group is caused to bear a variable magnification burden. A negative-lead zoom lens is known as a configuration suitable for obtaining a zoom lens having a wide angle of view although a large magnification ratio cannot be obtained as compared with the positive-lead zoom lens.

In order to achieve a wide angle in a zoom lens as described above, the negative-lead zoom lens is advantageous. However, in the negative-lead zoom lens, in order to achieve a large magnification ratio, it is necessary to increase a movement amount of a subsequent lens group including the second lens group. In this case, at a wide-angle end, it is necessary to widen a distance on an optical axis between a first lens group and the second lens group, and thus it is difficult to shorten the total length. In addition, when the movement amount of the lens group having positive refractive power included in the subsequent lens group increases, it becomes difficult to secure a bright F value at a telephoto end, and thus, there is a problem in which a difference in F value increases between the wide-angle end and the telephoto end. Furthermore, in order to favorably correct various aberrations such as field curvature and distortion aberration with respect to a pencil of light having a wide angle of view, when an aspherical lens having a large diameter is adopted as the first lens group, there is a problem in which the cost is greatly increased.

On the other hand, in the positive-lead zoom lens, in order to achieve both a wide angle and high variable magnification, it is important to appropriately set power arrangement, a lens configuration, and the like of each lens group.

For example, a positive-lead zoom lens is disclosed in JP 2014-228812 A. The zoom lens disclosed in JP 2014-228812 A includes, in order from the object side, a first lens group having positive refractive power, a second lens group having negative refractive power, a third lens group having positive refractive power, a fourth lens group having negative refractive power, and a fifth lens group having negative refractive power. The field angle of view at the wide-angle end is about 76° to 84°, and the magnification ratio is about 4.7 to 10.1 times. The zoom lens disclosed in JP 2014-228812 A achieves a relatively high magnification ratio. By further appropriately setting the power of the first lens group with respect to an entire system, further widening of the angle is expected.

Further, a negative-lead zoom lens is disclosed in JP 2018-159822 A. The zoom lens disclosed in JP 2018-159822 A includes, in order from the object side, a first lens group having negative refractive power, a second lens group having positive refractive power, a third lens group having negative refractive power, a fourth lens group having positive refractive power, and a fifth lens group having positive refractive power. The field angle of view at the wide-angle end is about 100° to 106°, and the magnification ratio is about 3.5 to 3.9 times. The zoom lens achieves both a wide angle and high variable magnification, but since an aspherical lens having a large diameter is adopted as a lens closest to the object side, there is a problem in which the cost increases. In addition, since movement amounts of the fourth lens group having positive refractive power and the fifth lens group having positive refractive power arranged on an image side are large, the F value is 5.81 to 6.43 at the telephoto end, and there is a problem in which brightness at the telephoto end is insufficient.

The present invention has been made in view of the above problems, and it is an object of the present invention to provide a zoom lens that achieves both a wide angle of view and a high magnification ratio and has high imaging performance while being manufacturable at low cost, and an imaging apparatus including the zoom lens.

SUMMARY OF THE INVENTION

In order to solve the above problem, a zoom lens according to the present invention comprises: in order from an object side, a first lens group having positive refractive power; a second lens group having negative refractive power; a third lens group having positive refractive power; a fourth lens group having negative refractive power; and a fifth lens group having positive refractive power, in which distances between the respective lens groups are changed to change magnification, the first lens group consists of one single lens having spherical surfaces on both sides, the single lens is a positive meniscus lens having a convex shape toward an object side, at a time of magnification change from a wide-angle end to a telephoto end, the second lens group moves along a path convex toward an image side, and following conditional expressions are satisfied:

$$8.0 \leq f1/fw \leq 14.0 \quad (1)$$

$$-2.5 \leq f2/fw \leq -1.2 \quad (2)$$

where
f1 is a focal length of the first lens group,
f2 is a focal length of the second lens group, and
fw is a focal length of the zoom lens at the wide-angle end.

In addition, in order to solve the above problems, an imaging apparatus according to the present invention includes the zoom lens and an image sensor that converts an optical image formed by the zoom lens into an electrical signal.

According to the present invention, it is possible to provide a zoom lens that achieves both a wide angle of view and a high magnification ratio and has high imaging performance while being manufacturable at low cost, and an imaging apparatus including the zoom lens.

DESCRIPTION OF THE EMBODIMENTS

Figure 1:
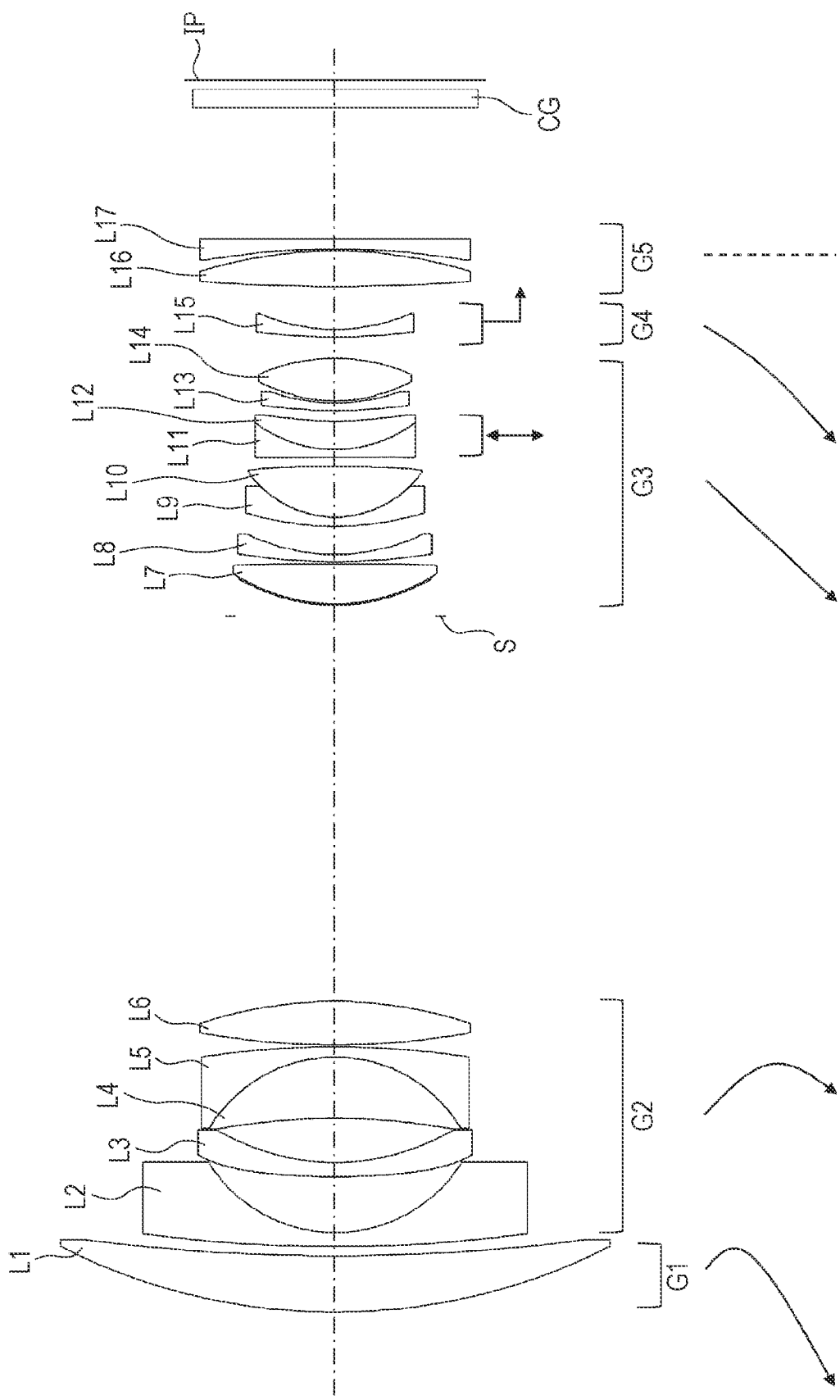
FIG. 1 illustrates a lens cross-sectional view of a zoom lens at a wide-angle end according to Example 1.

Hereinafter, embodiments of a zoom lens and an imaging apparatus according to the present invention will be described. However, the zoom lens and the imaging apparatus described below are one aspect of the zoom lens and the imaging apparatus according to the present invention, and the zoom lens and the imaging apparatus according to the present invention are not limited to the following aspect.

1. Zoom Lens 1-1. Optical Configuration

An exemplary embodiment of a zoom lens according to the present invention will be described. The zoom lens according to the present exemplary embodiment comprises, in order from an object side, a first lens group having positive refractive power, a second lens group having negative refractive power, a third lens group having positive refractive power, a fourth lens group having negative refractive power, and a fifth lens group having positive refractive power.

(1) First Lens Group

The first lens group is a lens group having positive refractive power. By arranging the lens group having positive refractive power closest to the object side, it is possible to easily achieve high variable magnification. In addition, the first lens group comprises one single lens having spherical surfaces on both sides, and the single lens is a positive meniscus lens having a convex shape toward the object side. By configuring the first lens group with one single lens having such a shape, it is easy to suppress occurrence of field curvature and distortion aberration for a pencil of light having a wide angle of view. Further, by configuring the first lens group with one positive meniscus lens having spherical surfaces on both sides, manufacturing cost of the zoom lens can be reduced. In addition, the positive meniscus lens is not an aspherical lens but a spherical lens having spherical surfaces on both sides, so that the cost can be further reduced.

(2) Second Lens Group

The second lens group is a lens group having negative refractive power as a whole. Although a specific lens configuration of the second lens group is not particularly limited, for example, the second lens group preferably includes, in order from the object side, a first negative meniscus lens having a convex surface facing the object side and a second negative meniscus lens having a convex surface facing the object side. With such a configuration, it is easy to favorably correct field curvature at the wide-angle end. Further, the second lens group preferably includes at least three negative lenses and at least two positive lenses. The first negative meniscus lens is preferably a spherical lens from a viewpoint of cost reduction.

(3) Third Lens Group

The third lens group is a lens group having positive refractive power as a whole. A specific configuration of the third lens group is not particularly limited, but preferably includes at least three positive lenses and at least two negative lenses. With such a configuration, it is easy to favorably correct spherical aberration in an entire variable magnification area. Further, by adopting this configuration, it is also easy to favorably correct a variation in field curvature accompanying a variation in object distance. The third lens group preferably includes an intermediate subgroup, a part of which is movable in a direction perpendicular to an optical axis. So-called blur correction can be performed by moving an image by moving the intermediate subgroup in the direction perpendicular to the optical axis. The intermediate subgroup preferably has negative refractive power for aberration correction. In particular, for aberration correction, the third lens group preferably includes, in order from the object side, a front subgroup having positive refractive power, an intermediate subgroup having negative refractive power, and a rear subgroup having positive refractive power, and blur correction is performed by the intermediate subgroup. In addition, the intermediate subgroup is preferably constituted by a cemented lens including a negative lens and a positive lens. With this configuration, it is possible to favorably correct eccentric chromatic aberration particularly at a time of blur correction.

(4) Fourth Lens Group

The fourth lens group is a lens group having negative refractive power as a whole. A specific configuration of the fourth lens group is not particularly limited, but is preferably constituted by one negative lens. The entire fourth lens group is preferably a focusing group. Therefore, when a single negative lens is used, quick autofocus can be easily achieved. In addition, the negative lens is preferably a negative meniscus lens having a convex shape toward the object side. With such a configuration, it is easy to suppress a variation in spherical aberration accompanying a variation in object distance.

(5) Fifth Lens Group

The fifth lens group is a lens group having positive refractive power as a whole. A specific configuration of the fifth lens group is not particularly limited, but preferably includes at least one positive lens and at least one negative lens. When the fifth lens group has positive refractive power, it is easy to secure a bright F value particularly at the telephoto end.

1-2. Operation (1) Variable Magnification

The zoom lens adopts the above configuration, and changes magnification by changing a distance on the optical axis between adjacent lens groups. At a time of magnification change from the wide-angle end to the telephoto end, the second lens group moves along a path convex toward the image side. Such movement facilitates shortening of a total length at the wide-angle end. At this time, at the telephoto end, the second lens group is preferably located closer to the image side than at the wide-angle end. In addition, at the time of magnification change from the wide-angle end to the telephoto end, the first lens group preferably moves along a path convex toward the image side, and is located, at the telephoto end, closer to the object side than at the wide-angle end. Such movement facilitates favorably correcting of the field curvature in the entire variable magnification area, and high variable magnification can be achieved. Further, at the time of magnification change, the fifth lens group may move to the object side, for example, but the fifth lens group is preferably fixed in an optical axis direction in order to simplify a variable magnification mechanism. When the first lens group and the second lens group move as described above, the third lens group and the fourth lens group preferably move to the object side at the time of magnification change.

(2) Focus

In the zoom lens, when focusing on a short-distance object from a point at infinity, the fourth lens group is preferably set as a focusing group and moved to the image side on the optical axis. In the zoom lens, the fourth lens group can be constituted by a small number of lenses of about one to two. Therefore, a weight of the focusing group is reduced, and quick focusing can be performed.

1-3. Conditional Expression

The zoom lens desirably adopts the above-described configuration and satisfies at least one conditional expression described below.

1-3-1. Conditional Expression (1)

$$8.0 \leq f1/fw \leq 14.0 \tag{1}$$

where f1 is a focal length of the first lens group, and fw is a focal length of the zoom lens at the wide-angle end.

The conditional expression (1) is a conditional expression for appropriately setting the focal length of the first lens group. By satisfying the conditional expression (1), it is possible to achieve both a wide angle and high variable magnification.

On the other hand, when a value of the conditional expression (1) is less than a lower limit value, the focal length of the first lens group becomes too short, it is difficult to correct negative field curvature, and it is difficult to achieve a wide angle. Further, in order to correct the negative field curvature, it is necessary to increase the number of lenses of the second lens group, which is not preferable because the cost increases. On the other hand, when the value of the conditional expression (1) exceeds an upper limit value, the focal length of the first lens group becomes too long, contribution of magnification change by the second lens group decreases, and it is difficult to achieve high variable magnification.

In order to obtain the above effect, the upper limit value of the conditional expression (1) is preferably 13.5, and more preferably 13.0. In addition, the lower limit value of the conditional expression (1) is preferably 8.5, more preferably 9.0, and still more preferably 9.5.

1-3-2. Conditional Expression (2)

$$-2.5 \leq f2/fw \leq -1.2 \tag{2}$$

where f2 is a focal length of the second lens group.

The conditional expression (2) is a conditional expression for appropriately setting the focal length of the second lens group. When the conditional expression (2) is satisfied, both a wide angle and good optical performance can be achieved.

On the other hand, when the value of the conditional expression (2) is less than the lower limit value, it is easy to favorably correct various aberrations at the wide-angle end, but it is difficult to obtain a desired angle of view. On the other hand, when the value of the conditional expression (2) exceeds the upper limit value, it is easy to achieve a wide angle, but in order to obtain good optical performance, the number of lenses of the second lens group increases, so that the cost increases, which is not preferable.

In order to obtain the above effect, the upper limit value of the conditional expression (2) is preferably −1.25, and more preferably −1.30. In addition, the lower limit value of the conditional expression (2) is preferably −2.30, more preferably −2.15, and still more preferably −2.00.

1-3-3. Conditional Expression (3)

$$1.3 \leq \beta2t/\beta2w \leq 2.0 \tag{3}$$

where $\beta2t$ is a lateral magnification of the second lens group at the telephoto end, and $\beta2w$ is a lateral magnification of the second lens group at the wide-angle end.

The conditional expression (3) is a conditional expression for appropriately setting a ratio between the lateral magnifications of the second lens group at the wide-angle end and a lateral magnification of the second lens group at the telephoto end, that is, a magnification ratio of the second lens group. By satisfying the conditional expression (3), it is possible to achieve high variable magnification while configuring the zoom lens with a small number of lenses.

On the other hand, when a value of the conditional expression (3) is less than the lower limit value, it is difficult to obtain a desired magnification ratio. In addition, in order to obtain a desired magnification ratio, it is necessary to gain a magnification ratio in a lens group on the image side from the second lens group, and it is necessary to increase the number of lenses of the third lens group and the fourth lens group, which is not preferable. On the other hand, when the value of the conditional expression (3) is greater than or equal to the upper limit value, it is easy to achieve high variable magnification, but it is difficult to favorably correct various aberrations.

In order to obtain the above effect, the upper limit value of the conditional expression (3) is preferably 1.9, more preferably 1.8, and still more preferably 1.7.

1-3-4. Conditional Expression (4)

$$3.8 \leq Rf/fw \leq 8.0 \tag{4}$$

where

Rf is a radius of curvature of the single lens constituting the first lens group on the object side.

The conditional expression (4) is a conditional expression for defining a ratio of the radius of curvature on the object side of the single lens (positive meniscus lens) constituting the first lens group. By satisfying the conditional expression (4), the field curvature can be favorably corrected with a small number of lenses.

On the other hand, when a value of the conditional expression (4) is less than the lower limit value, the field curvature in an over direction becomes too strong. On the other hand, when the value of the conditional expression (4) is greater than or equal to the upper limit value, the field curvature in an under direction becomes too strong. In either case, in order to favorably correct the field curvature, it is necessary to increase the number of lenses of the second lens group, which is not preferable.

In order to obtain the above effect, the upper limit value of the conditional expression (4) is preferably 7.5, and more preferably 7.0. In addition, the lower limit value of the conditional expression (4) is preferably 4.0, more preferably 4.1, and still more preferably 4.2.

1-3-5. Conditional Expression (5)

$$-0.8 \leq (Rf-Rb)/(Rf+Rb) \leq -0.35 \tag{5}$$

where

Rb is a radius of curvature on the image side of the single lens constituting the first lens group.

The conditional expression (5) is a conditional expression relating to a shape of the single lens constituting the first lens group, that is, a shape factor of the positive meniscus lens described above. By satisfying the conditional expression (5), it is possible to favorably correct the field curvature while configuring the zoom lens with a small number of lenses.

On the other hand, when a value of the conditional expression (5) is less than the lower limit value, the field curvature in the under direction becomes too strong. On the other hand, when the value of the conditional expression (5) exceeds the upper limit value, the field curvature in the over direction becomes too strong. In either case, in order to favorably correct the field curvature, it is necessary to increase the number of lenses of the second lens group, which is not preferable.

In order to obtain the above effect, the upper limit value of the conditional expression (5) is preferably −0.37, and more preferably −0.40. In addition, the lower limit value of the conditional expression (5) is preferably −0.75, and more preferably −0.70.

1-3-6. Conditional Expression (6)

$$1.3 \leq \beta 4t/\beta 4w \leq 2.2 \tag{6}$$

where $\beta 4t$ is a lateral magnification of the fourth lens group at the telephoto end, and $\beta 4w$ is a lateral magnification of the fourth lens group at the wide-angle end.

The conditional expression (6) is a conditional expression for appropriately setting a ratio between a lateral magnification of the fourth lens group at the wide-angle end and a lateral magnification of the fourth lens group at the telephoto end, that is, a magnification ratio of the fourth lens group. By satisfying the conditional expression (6), it is possible to achieve both reducing of the total length at the telephoto end and high variable magnification.

On the other hand, when a value of the conditional expression (6) is less than the lower limit value, a telephoto action becomes too weak, and the total length cannot be reduced at the telephoto end. On the other hand, when the value of the conditional expression (6) exceeds the upper limit value, the telephoto action becomes too strong, and it is difficult to favorably correct aberrations with a small number of lenses.

In order to obtain the above effect, the upper limit value of the conditional expression (6) is preferably 2.0, more preferably 1.9, and still more preferably 1.8. The lower limit value of the conditional expression (6) is preferably 1.35, and more preferably 1.40.

1-3-7. Conditional Expression (7)

In a case where the third lens group includes, in order from the object side, the front subgroup having positive refractive power, the intermediate subgroup having negative refractive power, and the rear subgroup having positive refractive power, it is preferable to satisfy a following conditional expression.

$$-5.0 \leq f3n/ft \leq -0.8 \tag{7}$$

where f3n is a focal length of the intermediate subgroup, and ft is a focal length of the zoom lens at the telephoto end.

The conditional expression (7) is a conditional expression for appropriately setting a ratio of the focal length of the intermediate subgroup to the focal length of the zoom lens at the telephoto end. When the third lens group is configured as described above and the intermediate subgroup is configured to move in the direction perpendicular to the optical axis, satisfying the conditional expression (7) makes it possible to reduce an amount of movement of the intermediate subgroup in the direction perpendicular to the optical axis at a time of blur correction, to facilitate arranging of a drive unit and the like for moving the intermediate subgroup in the direction perpendicular to the optical axis, and to reduce the size of the entire blur correction mechanism including the drive unit. At the same time, good vibration-compensation performance can be obtained.

On the other hand, when a value of the conditional expression (7) is less than the lower limit value, the movement amount of the intermediate subgroup at the time of blur correction increases, which leads to an increase in size of the blur correction mechanism, which is not preferable. On the other hand, when the upper limit of the conditional expression (7) is exceeded, the refractive power of the intermediate subgroup becomes too strong, and it becomes difficult to suppress occurrence of eccentric aberration at the time of blur correction.

In order to obtain the above effect, the upper limit value of the conditional expression (7) is preferably −0.9, more preferably −1.0, and still more preferably −1.1. In addition, the lower limit value of the conditional expression (7) is preferably −4.5, more preferably −4.0, and still more preferably −3.5.

1-3-8. Conditional Expression (8)

$$1.5 \leq f3/fw \leq 2.8 \quad (8)$$

where
f3 is a focal length of the third lens group.

The conditional expression (8) is a conditional expression for appropriately setting the focal length of the third lens group. When the conditional expression (8) is satisfied, it is possible to obtain good optical performance while configuring the zoom lens with a small number of lenses.

On the other hand, when the value of the conditional expression (8) is less than the lower limit value, the focal length of the third lens group becomes too short, and it is difficult to favorably correct various aberrations such as spherical aberration and coma aberration with a small number of lenses. On the other hand, when the value of the conditional expression (8) is greater than or equal to the upper limit value, the total length increases, which is not preferable.

In order to obtain the above effect, the upper limit value of the conditional expression (8) is preferably 2.7, more preferably 2.6, and still more preferably 2.5. In addition, the lower limit value of the conditional expression (8) is preferably 1.6, more preferably 1.7, and still more preferably 1.8.

2. Imaging Apparatus

Next, an imaging apparatus according to the present invention will be described. An imaging apparatus according to the present invention includes the zoom lens according to the present invention and an image sensor that converts an optical image formed by the zoom lens into an electrical signal. Note that the image sensor is preferably provided on the image side of the zoom lens. As the image sensor, a charge coupled device (CCD) sensor, a complementary metal oxide semiconductor (CMOS) sensor, or the like can be suitably used.

In particular, according to the zoom lens described above, it is possible to achieve both a wide angle of view at which a field angle of view exceeds 100° and a high magnification ratio, and to achieve high imaging performance while being manufacturable at low cost. The imaging apparatus is particularly suitable for a lens-interchangeable imaging apparatus such as a single lens reflex camera or a mirrorless camera, and can obtain an excellent captured image in an entire variable magnification area while appropriately adjusting an imaging magnification according to a distance to a subject.

Next, the present invention will be specifically described with reference to examples. However, the present invention is not limited to the following examples.

Example 1

(1) Optical Configuration

FIG. 1 is a cross-sectional view of a zoom lens according to Example 1 of the present invention at a wide-angle end during infinity focus. The zoom lens comprises, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power. Hereinafter, a specific configuration of each lens group will be described.

The first lens group G1 comprises a positive meniscus lens L1 having a convex surface facing the object side.

The second lens group G2 includes, in order from the object side, a negative meniscus lens L2 having a convex surface facing the object side, a negative meniscus lens L3 having a convex surface facing the object side, a cemented lens in which a positive meniscus lens L4 having a concave surface facing the object side and a negative meniscus lens L5 having a concave surface facing the object side are cemented, and a biconvex lens L6. The negative meniscus lens L3 is a glass molded aspherical lens having aspherical shapes on both sides.

The third lens group G3 includes, in order from the object side, a biconvex lens L7, a negative meniscus lens L8 having a convex surface facing the object side, a cemented lens in which a negative meniscus lens L9 having a convex surface facing the object side and a biconvex lens L10 are cemented, a cemented lens in which a biconcave lens L11 and a positive meniscus lens L12 having a convex surface facing the object side are cemented, a negative meniscus lens L13 having a convex surface facing the object side, and biconvex lens L14. The biconvex lens L7 is a composite resin type aspherical lens in which a composite resin film molded in an aspherical shape is attached to an object side surface. Further, the biconvex lens L14 is a glass molded aspherical lens having aspherical surfaces on both sides.

Further, in the third lens group G3, the cemented lens including the biconcave lens L11 and the positive meniscus lens L12 functions as the intermediate subgroup having negative refractive power described above, the object side subgroup having positive refractive power described above is closer to the object side than the intermediate subgroup, and the image side subgroup having positive refractive power described above is closer to the image side than the intermediate subgroup.

An aperture diaphragm S is disposed adjacent to the object side of the third lens group G3.

The fourth lens group G4 includes a negative meniscus lens L15 having a convex surface facing the object side.

The fifth lens group G5 includes, in order from the object side, a biconvex lens L16 and a concave flat lens L17 having a concave surface facing the object side.

When the magnification is changed from the wide-angle end to the telephoto end, the first lens group G1 moves along a path convex toward the image side, the second lens group G2 moves along a path convex toward the image side, the third lens group G3 moves toward the object side, the fourth lens group G4 moves toward the object side, and the fifth lens group G5 does not move and is fixed in the optical axis direction. The first lens group G1 is located closer to the object side at the telephoto end than at the wide-angle end, and the second lens group G2 is located closer to the image side at the telephoto end than at the wide-angle end.

When focusing from an infinity object to a short-distance object, the entire fourth lens group G4 becomes a focusing group and moves to the image side.

Further, at the time of blur correction, the intermediate subgroup including the biconcave lens L11 and the positive meniscus lens L12 is moved in the direction perpendicular to the optical axis as a vibration-compensation group.

Note that, in FIG. 1, "IP" represents an image plane, and specifically represents an imaging plane of an image sensor such as a CCD sensor or a CMOS sensor, or a film plane of a silver salt film, or the like. Further, a parallel flat plate having no substantial refractive power such as a cover glass CG is provided on the object side of the image plane IP. These points are similar in each lens cross-sectional view illustrated in other examples, and thus the description thereof will be omitted below.

(2) Numerical Value Examples

Next, numerical value examples to which specific numerical values of the zoom lens are applied will be described. Hereinafter, "lens data", "specification table", "variable distance", "lens group data", and "aspherical coefficient" are illustrated. In addition, values (TABLE 1) of respective formulas are collectively illustrated after Example 4.

In the "lens data", "surface number" indicates an order of the lens surface counted from the object side, "r" indicates the radius of curvature of a lens surface, "d" indicates a lens thickness or an air distance on the optical axis, "nd" indicates a refractive index at a d-line (wavelength λ=587.56 nm), and "vd" indicates an Abbe number at the d-line. In addition, in the column of "surface number", "ASPH" given after the surface number indicates that the lens surface is an aspherical surface, and "S" indicates that the surface is an aperture diaphragm. In the column of "d", "d (0)", "d (2)", and the like mean that the distance on the optical axis of the lens surface is a variable distance that changes at a time of magnification change. In addition, "∞" in the column of the radius of curvature means infinity, and means that the lens surface is a flat surface.

In the "specification table", "f" indicates a focal length of the zoom lens, "FNo." indicates an F value, "ω" indicates a half angle of view, and "Y" indicates an image height. Values at the wide-angle end, the intermediate focal length, and the telephoto end are illustrated.

The "variable distance" indicates values at the wide-angle end, the intermediate focal length, and the telephoto end during infinity focus and during short-distance object focus, respectively.

The "aspherical coefficient" indicates aspherical coefficients when an aspherical shape is defined as follows. Here, x is a displacement amount from a reference surface in the optical axis direction, r is a paraxial curvature radius, H is a height from the optical axis in the direction perpendicular to the optical axis, k is a conic coefficient, and An is an nth-order aspherical coefficient. In the table of "aspherical coefficient", "E±XX" represents an exponential notation and means "×10±XX".

$$x = \frac{H^2/r}{1+\sqrt{1-(1+k)(H/r)^2}} + A_4 H^4 + \qquad \text{[Mathematical formula 1]}$$
$$A_6 H^6 + A_8 H^8 + A_{10} H^{10} + A_{12} H^{12}$$

Since items in each of these tables are the same in each of the tables illustrated in other examples, the description thereof will be omitted below.

Figure 2:
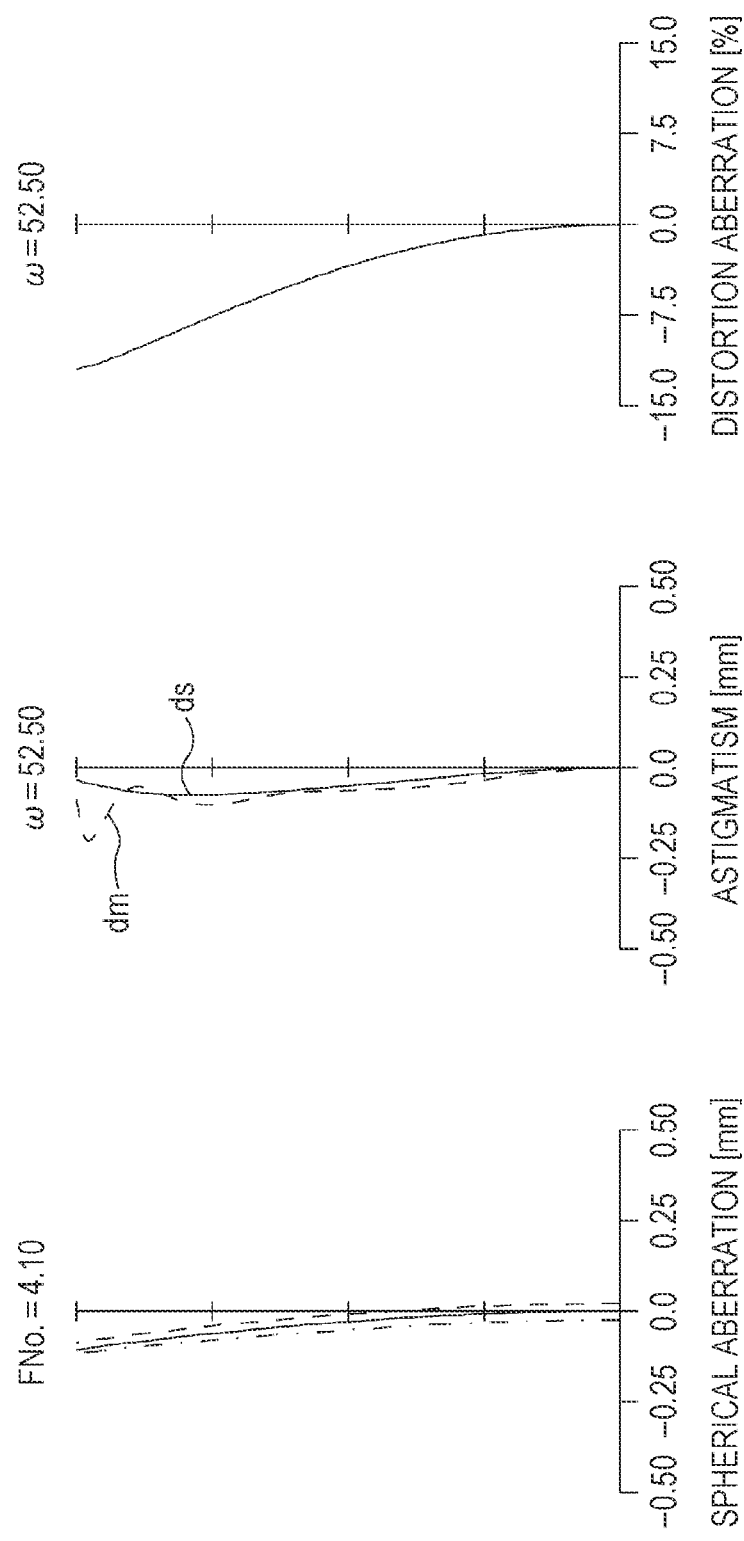
FIG. 2 illustrates aberration diagrams of the zoom lens according to Example 1 at the wide-angle end during infinity focus.
Figure 3:
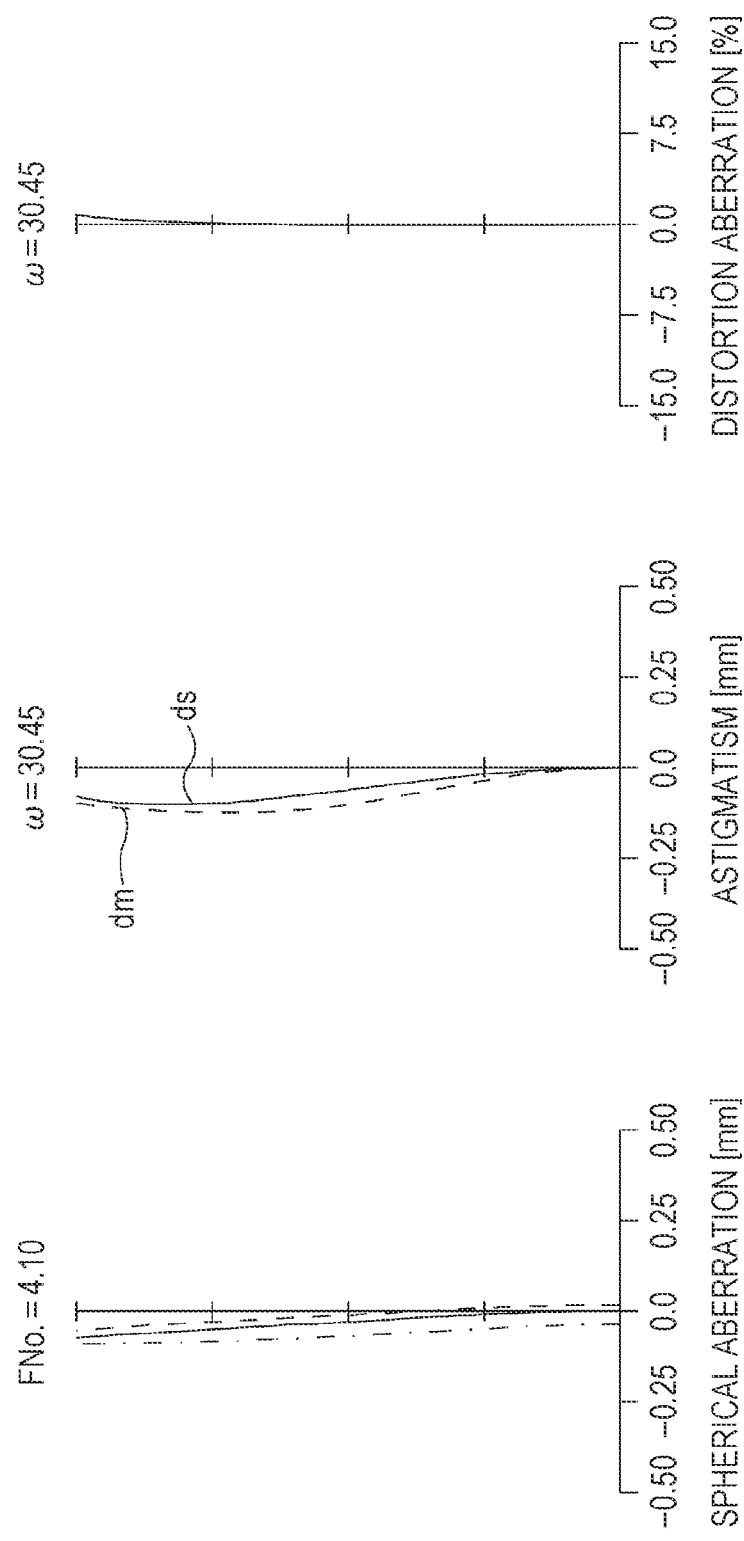
FIG. 3 illustrates aberration diagrams of the zoom lens according to Example 1 at an intermediate focal length during infinity focus.
Figure 4:
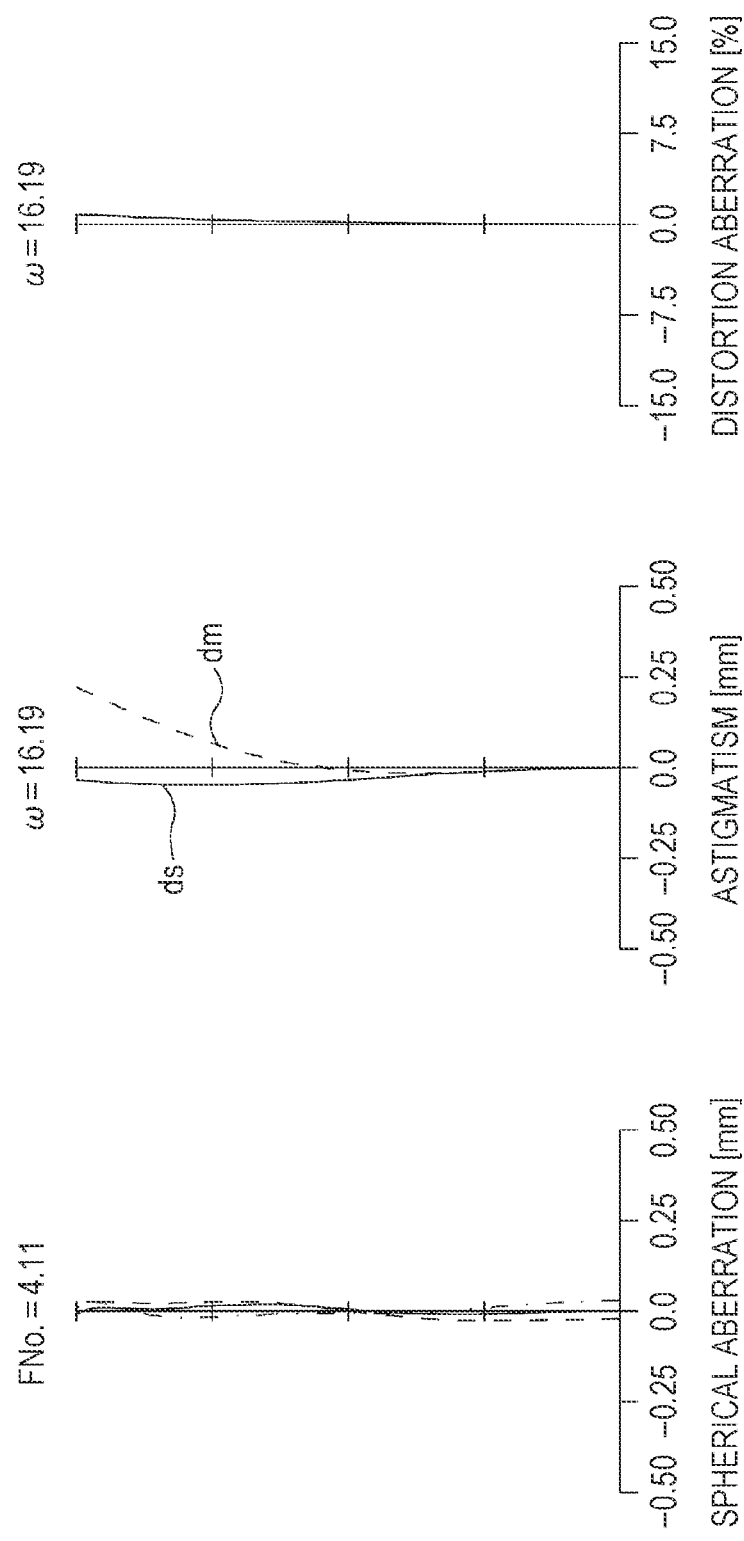
FIG. 4 illustrates aberration diagrams of the zoom lens according to Example 1 at a telephoto end during infinity focus.

Further, FIGS. 2, 3, and 4 illustrate longitudinal aberration diagrams of the zoom lens at the wide-angle end, the intermediate focal length, and the telephoto end during infinity focus. The longitudinal aberration diagrams illustrated in the drawings are spherical aberration (mm), astigmatism (mm), and distortion aberration (%) in order from a left side of each drawing. In the spherical aberration diagram, a solid line indicates spherical aberration at a d-line (wavelength: 587.56 nm), a broken line indicates spherical aberration at a C-line (wavelength: 656.28 nm), and a dash-dot line indicates spherical aberration at a g-line (wavelength: 435.84 nm). In the astigmatism diagram, a vertical axis indicates a half angle of view (ω), a horizontal axis indicates defocus, a solid line indicates a sagittal image plane (ds) of the d-line, and a broken line indicates a meridional image plane (dm) of the d-line. In the distortion aberration diagram, a vertical axis represents a half angle of view (ω), and a horizontal axis represents distortion aberration. These items are the same in aberration diagrams illustrated in other examples, and thus the description thereof will be omitted below.

[Lens data]

| Surface number | r | d | nd | vd |
|---|---|---|---|---|
| Object surface | ∞ | d(0) | | |
| 1 | 65.0021 | 6.0182 | 1.61800 | 63.39 |
| 2 | 208.6666 | d(2) | | |
| 3 | 155.8807 | 1.5000 | 1.87070 | 40.73 |
| 4 | 16.0000 | 6.0104 | | |
| 5ASPH | 98.7797 | 1.5000 | 1.72903 | 54.04 |
| 6ASPH | 24.0807 | 4.7210 | | |
| 7 | −70.3366 | 6.5726 | 1.67270 | 32.10 |
| 8 | −15.7148 | 1.1000 | 1.87070 | 40.73 |
| 9 | −94.8015 | 0.2000 | | |
| 10 | 80.9687 | 4.6621 | 1.73800 | 32.33 |
| 11 | −45.3782 | d(11) | | |
| 12S | ∞ | 1.2000 | | |
| 13ASPH | 18.9463 | 0.1500 | 1.53610 | 41.21 |
| 14 | 19.9276 | 4.3209 | 1.74320 | 49.34 |
| 15 | −338.4212 | 0.2000 | | |
| 16 | 65.1971 | 0.8000 | 1.48749 | 70.24 |
| 17 | 21.8634 | 3.0000 | | |
| 18 | 32.3661 | 1.0000 | 1.90366 | 31.31 |
| 19 | 11.3676 | 5.4183 | 1.61800 | 63.39 |
| 20 | −110.4950 | 1.0000 | | |
| 21 | −2558.7169 | 0.8000 | 1.85478 | 24.80 |
| 22 | 14.1244 | 3.0765 | 1.92286 | 20.88 |
| 23 | 45.6862 | 1.1217 | | |
| 24 | 56.7504 | 0.8000 | 1.87070 | 40.73 |
| 25 | 20.4783 | 0.2000 | | |

-continued

| | | | | |
|---|---|---|---|---|
| 26 ASPH | 15.2031 | 4.5847 | 1.49700 | 81.61 |
| 27 ASPH | −20.4871 | d(27) | | |
| 28 | 71.7674 | 0.8000 | 1.83481 | 42.72 |
| 29 | 20.0798 | d(29) | | |
| 30 | 227.4254 | 3.7769 | 1.84666 | 23.78 |
| 31 | −48.7181 | 0.2000 | | |
| 32 | −82.9567 | 1.1000 | 1.83481 | 42.72 |
| 33 | ∞ | d(33) | | |
| 34 | ∞ | 2.0000 | 1.51680 | 64.20 |
| 35 | ∞ | 1.0000 | | |
| Image plane | ∞ | | | |

[Specification table]

| | Wide-angle end | Intermediate | Telephoto end |
|---|---|---|---|
| f | 12.4002 | 23.9969 | 48.4948 |
| FNo. | 4.1032 | 4.1014 | 4.1091 |
| ω | 52.4982 | 30.4487 | 16.1929 |
| Y | 14.2000 | 14.2000 | 14.2000 |

[Variable distance]

| | Wide-angle end | Intermediate | Telephoto end | Wide-angle end | Intermediate | Telephoto end |
|---|---|---|---|---|---|---|
| d(0) | ∞ | ∞ | ∞ | 117.9999 | 116.0079 | 87.4758 |
| d(2) | 1.0000 | 18.6880 | 39.8788 | 1.0000 | 13.6380 | 39.8738 |
| d(11) | 41.2343 | 14.8729 | 1.8000 | 41.2343 | 14.8729 | 1.8000 |
| d(27) | 2.2994 | 3.1401 | 2.3042 | 3.0270 | 4.7519 | 5.6427 |
| d(29) | 4.6331 | 14.4578 | 35.7080 | 3.9055 | 12.8460 | 32.3695 |
| d(33) | 14.0000 | 14.0000 | 14.0000 | 14.0000 | 14.0000 | 14.0000 |

[Lens group data]

| Group No. | Focal length |
|---|---|
| G1 | 150.3660 |
| G2 | −23.1003 |
| G3 | 25.6267 |
| G4 | −33.6343 |
| G5 | 90.7032 |

[Aspherical coefficient]

| Surface number | k | A4 | A6 | A8 | A10 | A12 |
|---|---|---|---|---|---|---|
| 5 | 0.0000 | 2.05256E−05 | −7.71686E−08 | 1.39025E−09 | −7.53929E−12 | 1.54103E−14 |
| 6 | −2.0659 | 1.65972E−05 | −8.91756E−08 | 1.44815E−09 | −9.11239E−12 | 1.68520E−14 |
| 13 | −0.4968 | −8.90716E−06 | −3.63667E−08 | 3.16922E−10 | −3.36685E−12 | 1.21169E−14 |
| 26 | −2.1426 | 5.71665E−06 | −4.03507E−09 | −2.79675E−09 | 2.97656E−11 | 4.90854E−14 |
| 27 | 0.0039 | 1.26990E−06 | 4.10245E−08 | −5.32603E−09 | 4.19031E−11 | 0.00000E+00 |

Example 2

(1) Optical Configuration

Figure 5:
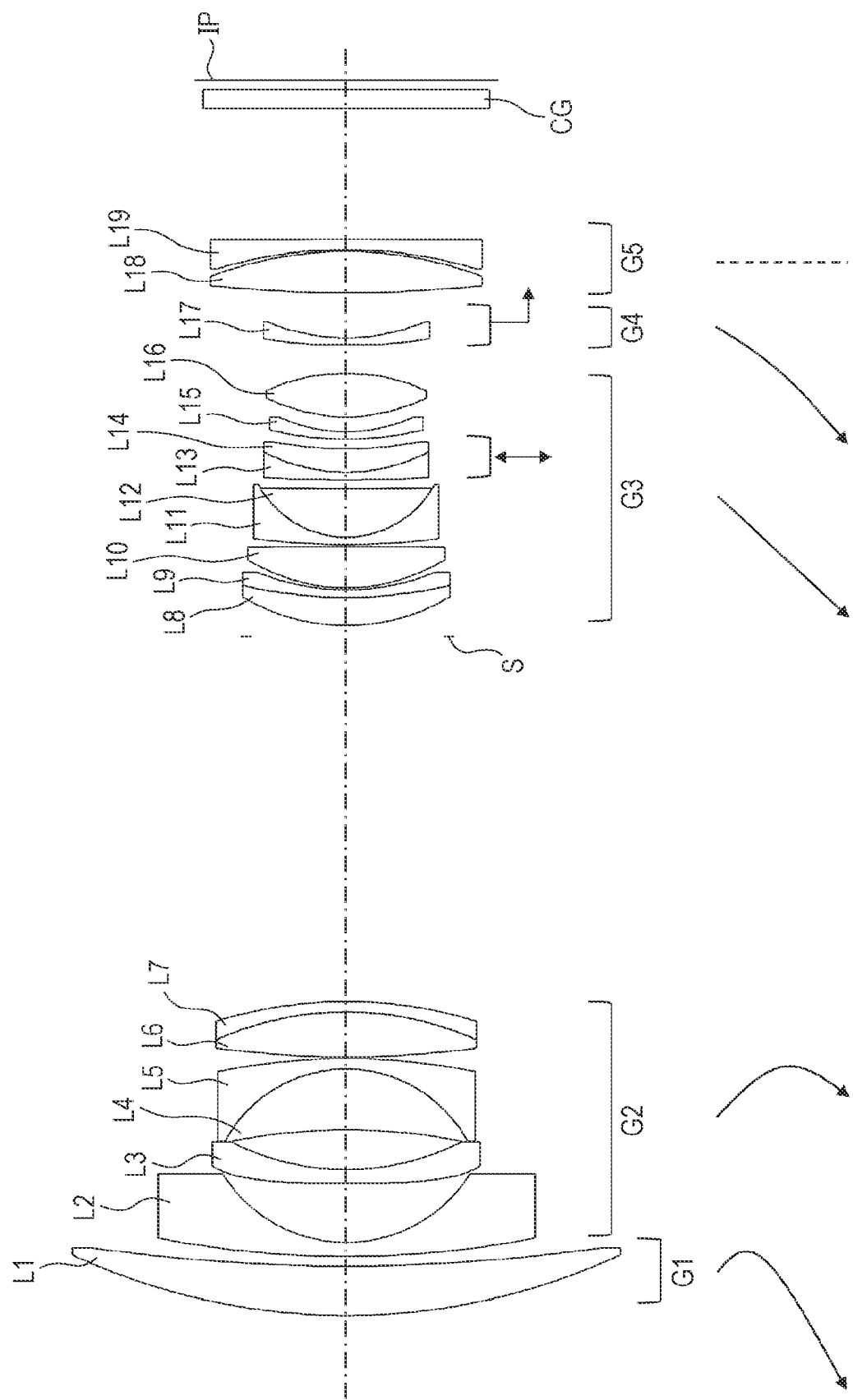
FIG. 5 illustrates a lens cross-sectional view of a zoom lens according to Example 2 at a wide-angle end.

FIG. 5 is a cross-sectional view of a zoom lens according to Example 2 of the present invention at the wide-angle end during infinity focus. The zoom lens comprises, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power. Hereinafter, a specific configuration of each lens group will be described.

The first lens group G1 comprises a positive meniscus lens L1 having a convex surface facing the object side.

The second lens group G2 includes, in order from the object side, a negative meniscus lens L2 having a convex surface facing the object side, a negative meniscus lens L3 having a convex surface facing the object side, a cemented lens in which a positive meniscus lens L4 having a concave surface facing the object side and a negative meniscus lens L5 having a concave surface facing the object side are cemented, and a cemented lens in which a biconvex lens L6 and a negative meniscus lens L7 having a concave surface facing the object side are cemented. The negative meniscus lens L3 is a glass molded aspherical lens having aspherical shapes on both sides.

The third lens group G3 includes, in order from the object side, a cemented lens in which a positive meniscus lens L8 having a convex surface facing the object side and a negative meniscus lens L9 having a convex surface facing the object side are cemented, a biconvex lens L10, a cemented lens in which a negative meniscus lens L11 having a convex surface facing the object side and a positive meniscus lens L12 having a convex surface facing the object side are cemented, a cemented lens in which a negative meniscus lens L13 having a convex surface facing the object side and a positive meniscus lens L14 having a convex surface facing the object side are cemented, a negative meniscus lens L15 having a convex surface facing the object side, and a biconvex lens L16. The biconvex lens L10 is a glass molded aspherical lens having an aspherical object side surface. Further, the biconvex lens L16 is a glass molded aspherical lens having aspherical surfaces on both sides.

Further, in the third lens group G3, the cemented lens including the negative meniscus lens L13 and the positive meniscus lens L14 functions as the intermediate subgroup having negative refractive power described above, the object side subgroup having positive refractive power described above is closer to the object side than the intermediate subgroup, and the image side subgroup having positive refractive power described above is closer to the image side than the intermediate subgroup.

An aperture diaphragm S is disposed adjacent to the object side of the third lens group G3.

The fourth lens group G4 includes a negative meniscus lens L17 having a convex surface facing the object side.

The fifth lens group G5 includes, in order from the object side, a biconvex lens L18 and a negative meniscus lens L19 having a concave surface facing the object side.

When the magnification is changed from the wide-angle end to the telephoto end, the first lens group G1 moves along a path convex toward the image side, the second lens group G2 moves along a path convex toward the image side, the third lens group G3 moves toward the object side, the fourth lens group G4 moves toward the object side, and the fifth lens group G5 does not move and is fixed in the optical axis direction. The first lens group G1 is located closer to the object side at the telephoto end than at the wide-angle end, and the second lens group G2 is located closer to the image side at the telephoto end than at the wide-angle end.

When focusing from an infinity object to a short-distance object, the entire fourth lens group G4 becomes a focusing group and moves to the image side.

Furthermore, at the time of blur correction, the intermediate subgroup including the negative meniscus lens L13 and the positive meniscus lens L14 is moved in the direction perpendicular to the optical axis as a vibration-compensation group.

(2) Numerical Value Examples

Figure 6:
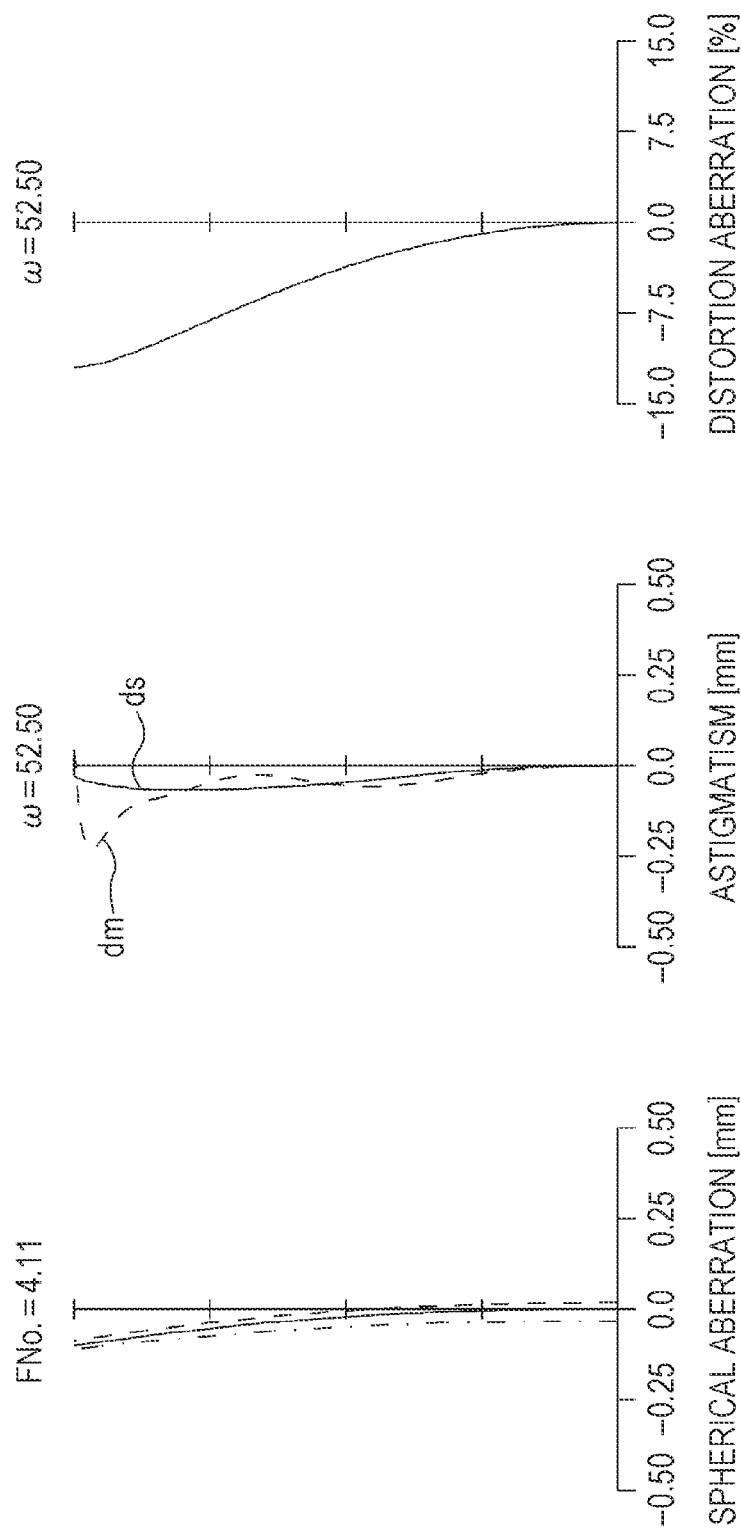
FIG. 6 illustrates aberration diagrams of the zoom lens according to Example 2 at the wide-angle end during infinity focus.
Figure 7:
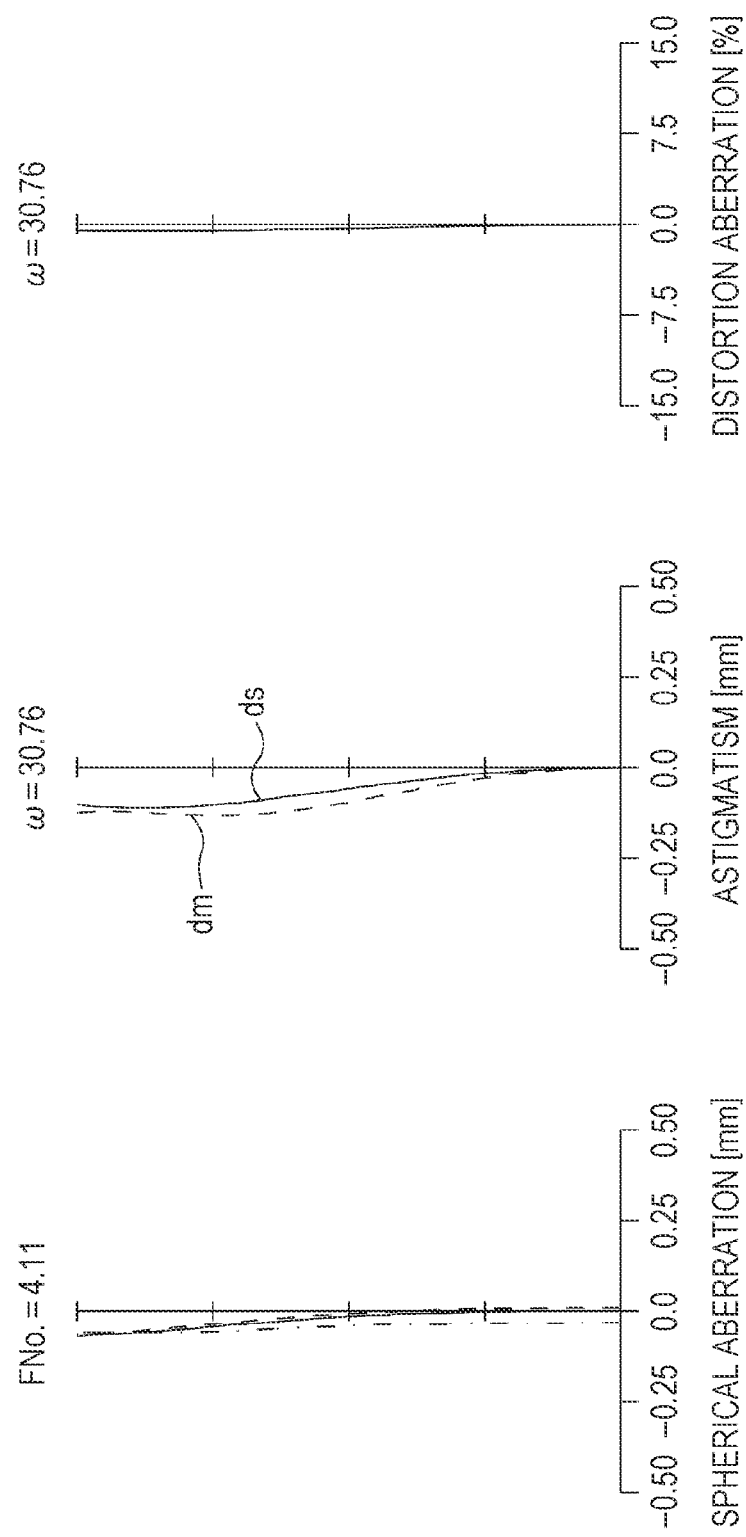
FIG. 7 illustrates aberration diagrams of the zoom lens according to Example 2 at an intermediate focal length during infinity focus.
Figure 8:
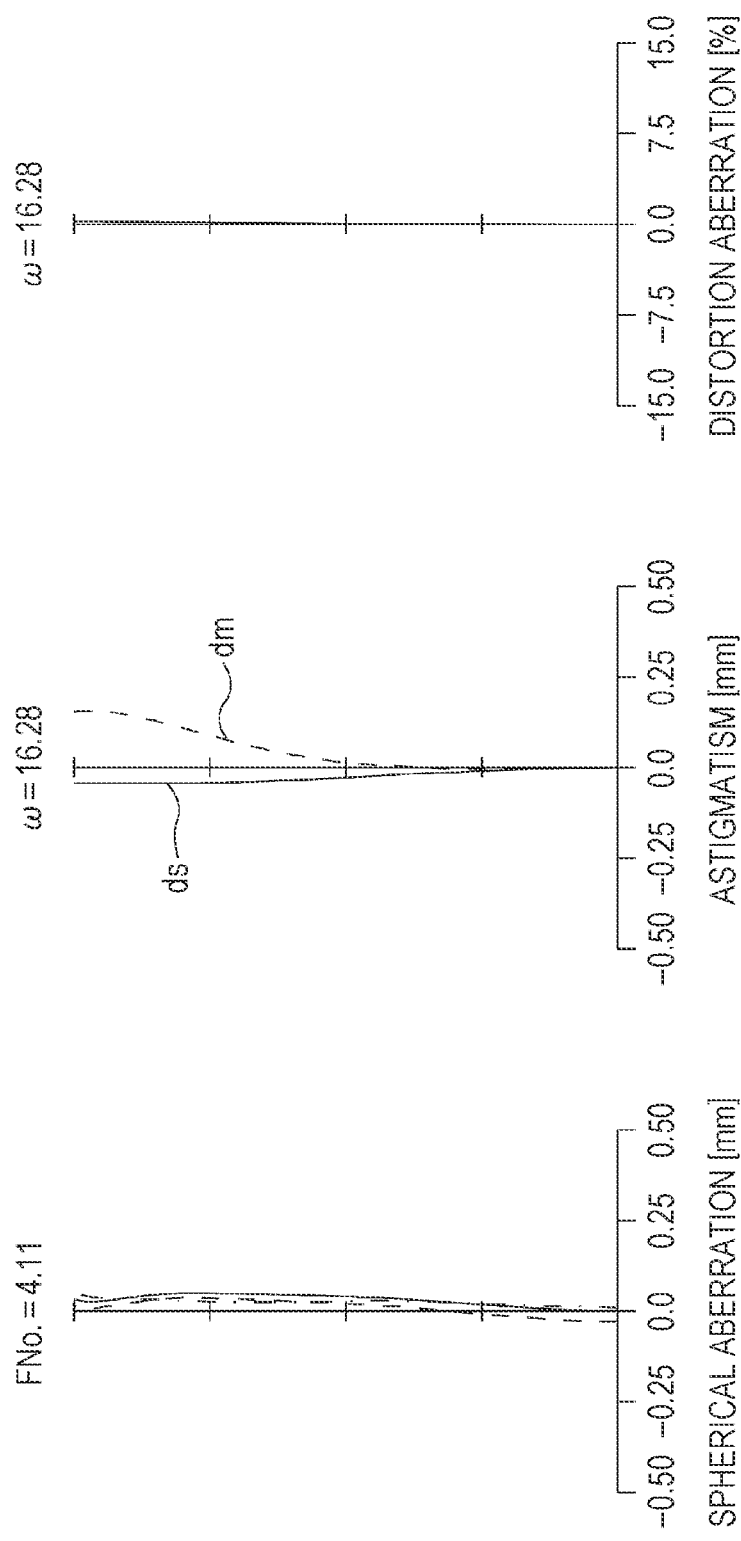
FIG. 8 illustrates aberration diagrams of the zoom lens of Example 2 at a telephoto end during infinity focus.

Next, numerical value examples to which specific numerical values of the zoom lens are applied will be described. Hereinafter, "lens data", "specification table", "variable distance", "lens group data", and "aspherical coefficient" are illustrated. Further, FIGS. 6 to 8 illustrate longitudinal aberration diagrams of the zoom lens at the wide-angle end, the intermediate focal length, and the telephoto end during infinity focus.

| [Lens data] | | | | |
|---|---|---|---|---|
| Surface number | r | d | nd | vd |
| Object surface | ∞ | d(0) | | |
| 1 | 69.6489 | 5.2838 | 1.72916 | 54.67 |
| 2 | 193.9477 | d(2) | | |
| 3 | 104.0246 | 1.5000 | 1.91082 | 35.25 |
| 4 | 15.5600 | 6.3028 | | |
| 5ASPH | 264.5900 | 1.5000 | 1.69350 | 53.18 |
| 6ASPH | 27.8502 | 4.2366 | | |
| 7 | −62.2995 | 6.5018 | 1.63980 | 34.47 |
| 8 | −14.7379 | 1.1000 | 1.87070 | 40.73 |
| 9 | −69.7945 | 0.2000 | | |
| 10 | 102.7877 | 4.8134 | 1.78880 | 28.43 |
| 11 | −33.7490 | 1.1000 | 1.78800 | 47.37 |
| 12 | −47.0827 | d(12) | | |
| 13S | ∞ | 1.2000 | | |
| 14 | 21.5997 | 3.0190 | 1.85478 | 24.80 |
| 15 | 49.2140 | 0.8000 | 1.62004 | 36.26 |
| 16 | 24.8239 | 0.2000 | | |
| 17ASPH | 18.7372 | 4.4371 | 1.61800 | 63.39 |
| 18 | −808.6457 | 0.2000 | | |
| 19 | 79.0351 | 0.8000 | 1.90366 | 31.31 |
| 20 | 10.6812 | 5.1490 | 1.61800 | 63.39 |
| 21 | 362.7287 | 1.0000 | | |
| 22 | 163.9695 | 0.8000 | 1.78472 | 25.72 |
| 23 | 18.9351 | 2.5191 | 1.92286 | 20.88 |
| 24 | 44.3337 | 1.0000 | | |
| 25 | 34.3399 | 0.8000 | 1.90366 | 31.31 |
| 26 | 17.0919 | 1.5765 | | |
| 27ASPH | 16.7422 | 4.6570 | 1.49700 | 81.61 |
| 28ASPH | −21.7616 | d(28) | | |
| 29 | 60.1576 | 0.8000 | 1.87070 | 40.73 |
| 30 | 21.9605 | d(30) | | |
| 31 | 146.5671 | 4.3628 | 1.84666 | 23.78 |
| 32 | −41.2076 | 0.2000 | | |
| 33 | −48.1238 | 1.1000 | 1.83481 | 42.72 |
| 34 | −1190.7465 | d(34) | | |
| 35 | ∞ | 2.0000 | 1.51680 | 64.20 |
| 36 | ∞ | 1.0000 | | |

| [Specification table] | | |
|---|---|---|
| | Wide-angle end | Intermediate | Telephoto end |
| f | 12.3964 | 23.9947 | 48.4941 |
| FNo. | 4.1089 | 4.1105 | 4.1103 |

-continued

|   | | | |
|---|---|---|---|
| ω | 52.4993 | 30.7592 | 16.2779 |
| Y | 14.2000 | 14.2000 | 14.2000 |

[Variable distance]

|  | Wide-angle end | Intermediate | Telephoto end | Wide-angle end | Intermediate | Telephoto end |
|---|---|---|---|---|---|---|
| d(0) | ∞ | ∞ | ∞ | 198.0011 | 195.1521 | 164.0136 |
| d(2) | 1.0000 | 17.3092 | 39.6878 | 1.0000 | 17.3092 | 39.6878 |
| d(12) | 38.9832 | 13.6234 | 1.3000 | 33.9832 | 13.6234 | 1.3000 |
| d(28) | 3.0237 | 3.5878 | 2.3061 | 3.5775 | 4.8407 | 4.9781 |
| d(30) | 4.8331 | 16.1686 | 38.5336 | 4.2793 | 14.9156 | 35.8616 |
| d(34) | 14.0000 | 14.0000 | 14.0000 | 14.0000 | 14.0000 | 14.0000 |

[Lens group data]

| Group | Focal length |
|---|---|
| G1 | 146.4170 |
| G2 | −22.3208 |
| G3 | 26.8486 |
| G4 | −40.1131 |
| G5 | 103.0230 |

[Aspherical coefficient]

| Surface number | k | A4 | A6 | A8 | A10 | A12 |
|---|---|---|---|---|---|---|
| 5 | 0.0000 | 4.34520E−05 | −4.03495E−07 | 4.43036E−09 | −2.27373E−11 | 4.80977E−14 |
| 6 | −0.1189 | 2.37878E−05 | −4.98167E−07 | 5.94419E−09 | −3.57959E−11 | 8.25015E−14 |
| 17 | 0.0000 | −1.40958E−05 | −3.81981E−03 | −1.37554E−10 | 1.30953E−14 | 0.00000E+00 |
| 27 | −2.7772 | 1.23394E−05 | −1.18067E−07 | −1.31728E−10 | −2.66505E−11 | 3.89725E−13 |
| 28 | 0.9331 | −1.26243E−06 | −1.76548E−08 | −2.62179E−09 | −1.22192E−11 | 2.49571E−13 |

Example 3

(1) Optical Configuration

Figure 9:
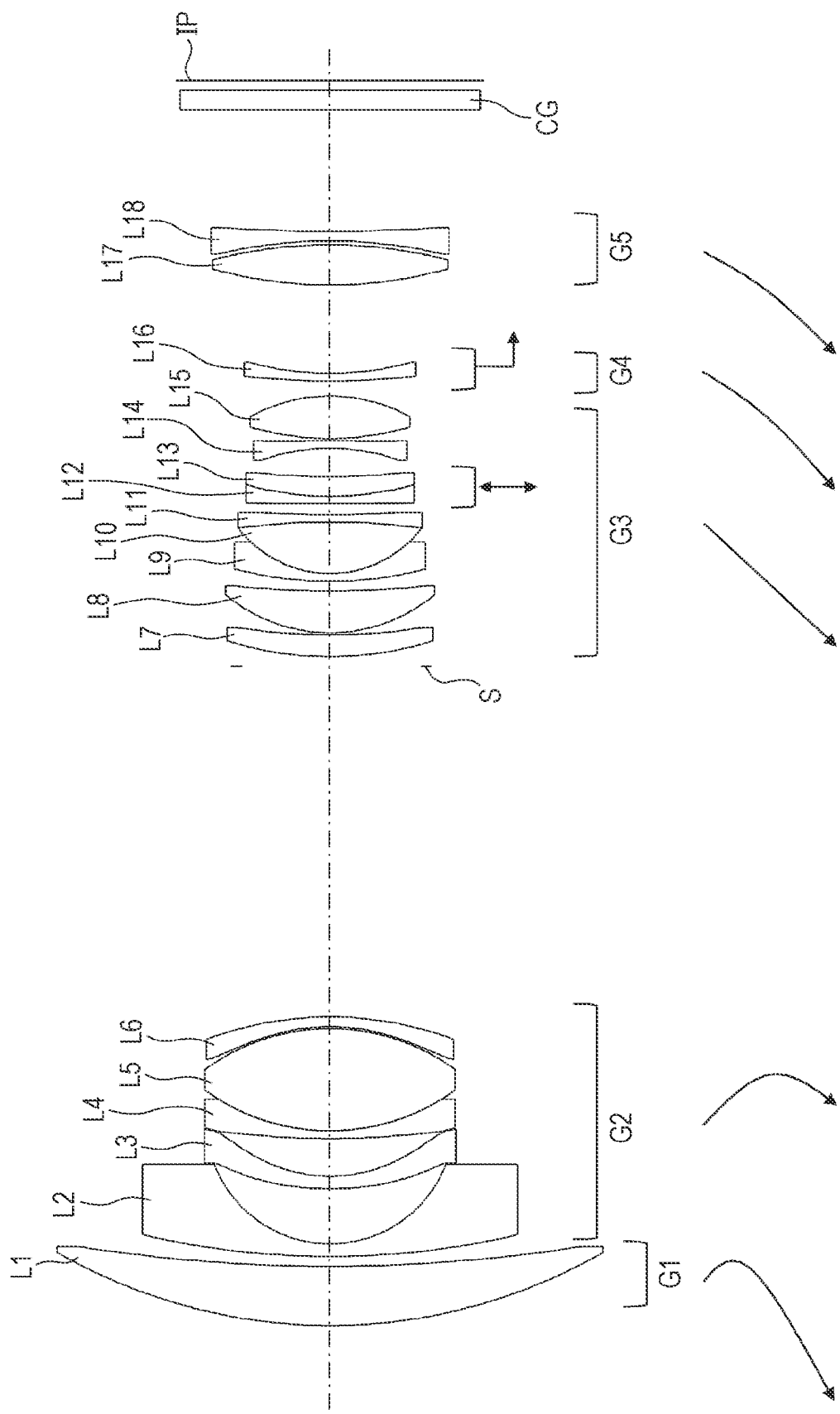
FIG. 9 illustrates a lens cross-sectional view of a zoom lens according to Example 3 at a wide-angle end.

FIG. 9 is a cross-sectional view of a zoom lens according to Example 3 of the present invention at the wide-angle end during infinity focus. The zoom lens comprises, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power. Hereinafter, a specific configuration of each lens group will be described.

The first lens group G1 comprises a positive meniscus lens L1 having a convex surface facing the object side.

The second lens group G2 includes, in order from the object side, a negative meniscus lens L2 having a convex surface facing the object side, a negative meniscus lens L3 having a convex surface facing the object side, a cemented lens in which a negative meniscus lens L4 having a convex surface facing the object side and a biconvex lens L5 are cemented, and a negative meniscus lens L6 having a concave surface facing the object side. The negative meniscus lens L3 is a glass molded aspherical lens having aspherical shapes on both sides. The negative meniscus lens L6 is a glass molded aspherical lens having an aspherical object side surface.

The third lens group G3 includes, in order from the object side, a positive meniscus lens L7 having a convex surface facing the object side, a positive meniscus lens L8 having a convex surface facing the object side, a cemented lens in which three lenses of a negative meniscus lens L9 having a convex surface facing the object side, a biconvex lens L10, and a biconcave lens L11 are cemented, a cemented lens in which a negative meniscus lens L12 having a convex surface facing the object side and a positive meniscus lens L13 having a convex surface facing the object side, a negative meniscus lens L14 having a concave surface facing the object side, and a biconvex lens L15. The negative meniscus lens L14 is a glass molded aspherical lens having aspherical shapes on both sides. The biconvex lens L15 is a glass molded aspherical lens having an aspherical object side surface.

Further, in the third lens group G3, the cemented lens including the negative meniscus lens L12 and the positive meniscus lens L13 functions as the intermediate subgroup having negative refractive power described above, the object side subgroup having positive refractive power described above is closer to the object side than the intermediate subgroup, and the image side subgroup having positive refractive power described above is closer to the image side than the intermediate subgroup.

An aperture diaphragm S is disposed adjacent to the object side of the third lens group G3.

The fourth lens group G4 includes a negative meniscus lens L16 having a convex surface facing the object side.

The fifth lens group G5 includes, in order from the object side, a biconvex lens L17 and a biconcave lens L18.

When the magnification is changed from the wide-angle end to the telephoto end, the first lens group G1 moves along a path convex toward the image side, the second lens group G2 moves along a path convex toward the image side, the third lens group G3 moves toward the object side, the fourth lens group G4 moves toward the object side, and the fifth lens group G5 moves toward the object side. The first lens group G1 is located closer to the object side at the telephoto end than at the wide-angle end, and the second lens group G2 is located closer to the image side at the telephoto end than at the wide-angle end.

When focusing from an infinity object to a short-distance object, the entire fourth lens group G4 becomes a focusing group and moves to the image side.

Furthermore, at the time of blur correction, the intermediate subgroup including the negative meniscus lens L12 and the positive meniscus lens L13 is moved in the direction perpendicular to the optical axis as a vibration-compensation group.

(2) Numerical Value Examples

Figure 10:
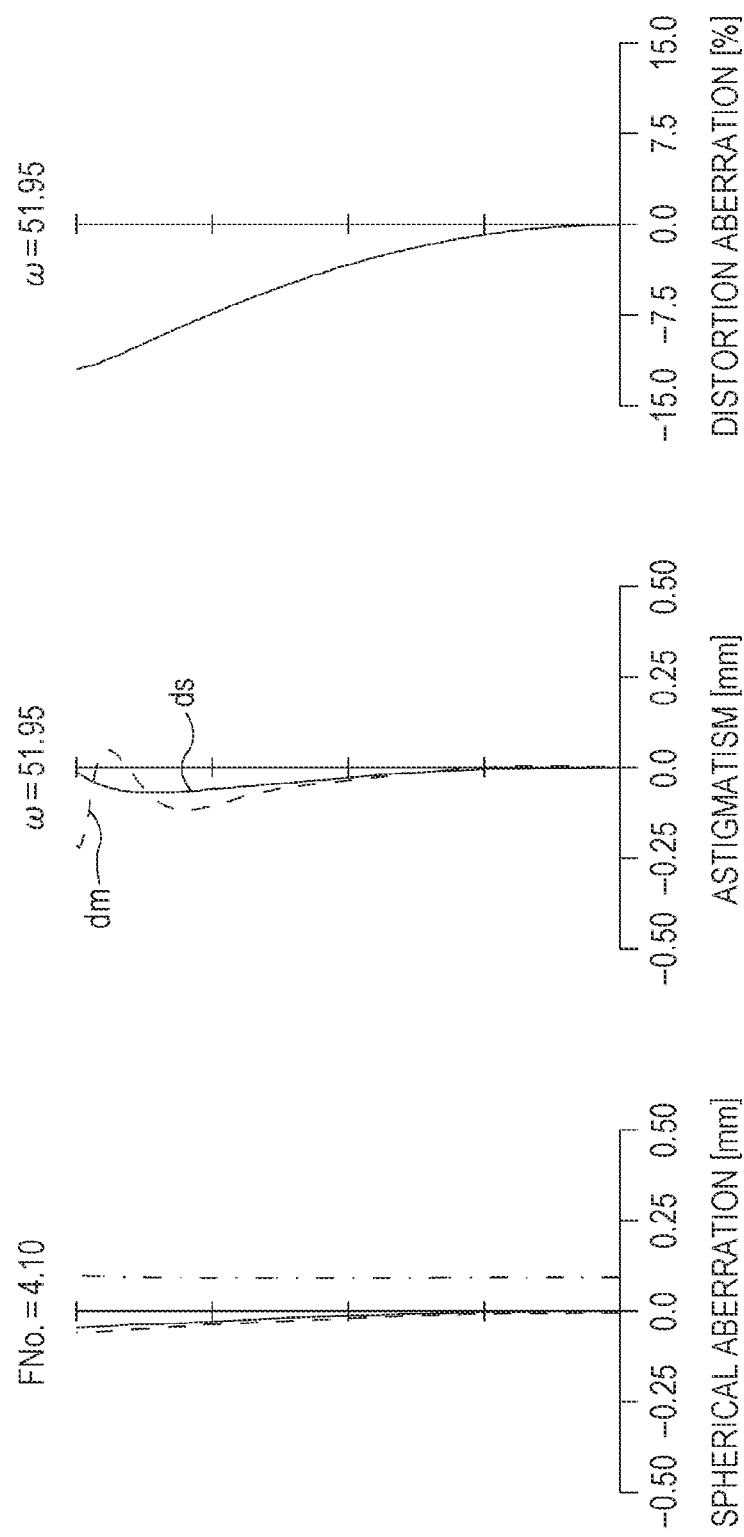
FIG. 10 illustrates aberration diagrams of the zoom lens of Example 3 at the wide-angle end during infinity focus.
Figure 11:
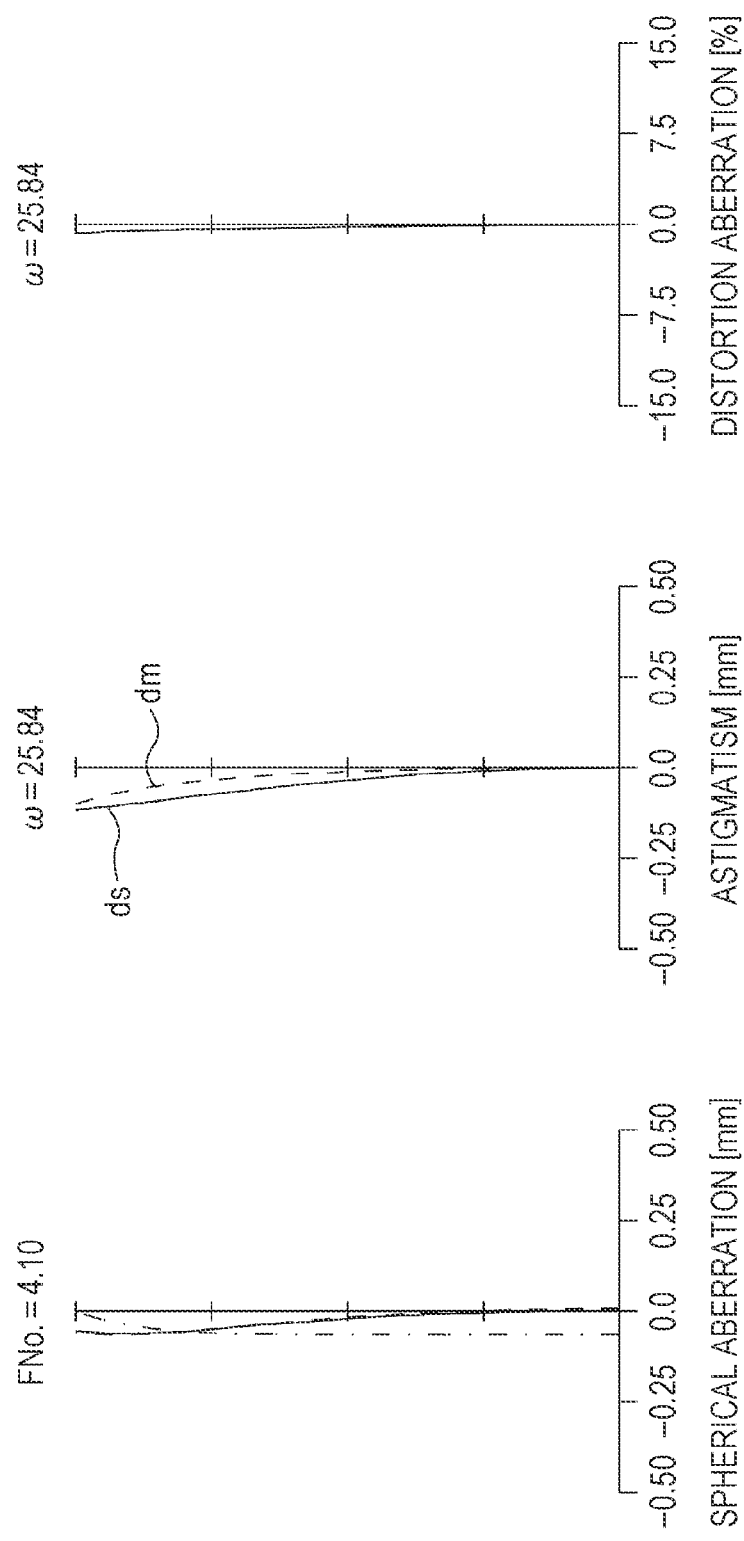
FIG. 11 illustrates aberration diagrams of the zoom lens according to Example 3 at an intermediate focal length during infinity focus.
Figure 12:
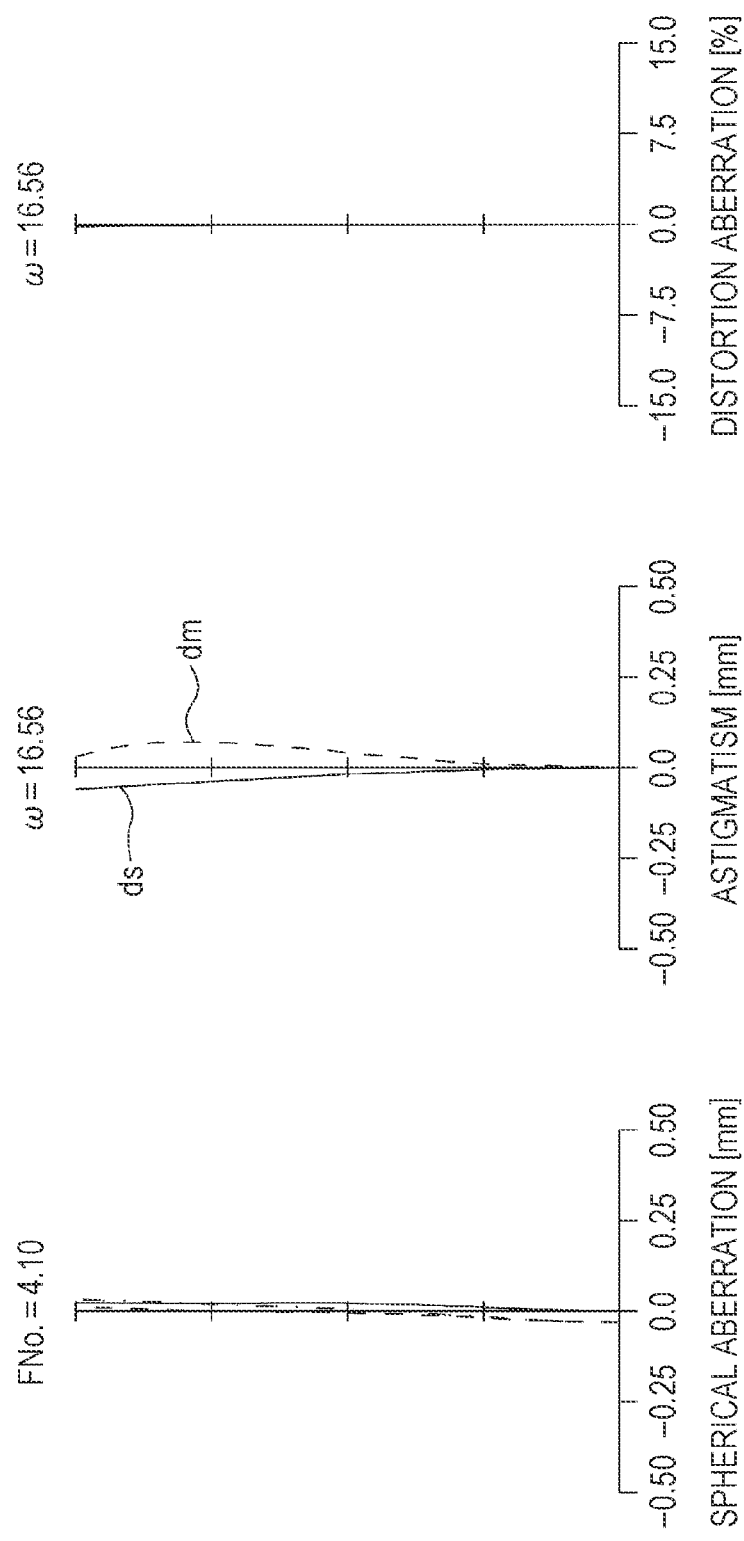
FIG. 12 illustrates aberration diagrams of the zoom lens of Example 3 at a telephoto end during infinity focus.

Next, numerical value examples to which specific numerical values of the zoom lens are applied will be described. Hereinafter, "lens data", "specification table", "variable distance", "lens group data", and "aspherical coefficient" are illustrated. FIGS. 10 to 12 illustrate longitudinal aberration diagrams of the zoom lens at the wide-angle end, the intermediate focal length, and the telephoto end during infinity focus.

[Lens data]

| Surface number | r | d | nd | vd |
|---|---|---|---|---|
| Object surface | ∞ | d(0) | | |
| 1 | 56.4125 | 6.0693 | 1.59282 | 68.62 |
| 2 | 166.5846 | d(2) | | |
| 3 | 84.3690 | 1.3000 | 1.88300 | 40.80 |
| 4 | 12.7689 | 5.6656 | | |
| 5ASPH | 30.0107 | 1.3000 | 1.69350 | 53.18 |
| 6ASPH | 15.0273 | 3.8732 | | |
| 7 | 86.8704 | 0.8000 | 1.88300 | 40.80 |
| 8 | 21.8360 | 10.5159 | 1.67270 | 32.10 |
| 9 | −21.8236 | 0.2000 | | |
| 10ASPH | −20.1793 | 1.0000 | 1.77377 | 47.17 |
| 11 | −36.4654 | d(11) | | |
| 12S | ∞ | 1.0000 | | |
| 13 | 35.2263 | 2.2633 | 1.92286 | 20.88 |
| 14 | 62.3832 | 0.2000 | | |
| 15 | 16.7084 | 4.3134 | 1.61800 | 63.39 |
| 16 | 98.6510 | 0.9912 | | |
| 17 | 39.0770 | 0.8000 | 1.90366 | 31.31 |
| 18 | 11.8702 | 5.2808 | 1.61800 | 63.39 |
| 19 | −77.0307 | 0.8000 | 1.88300 | 40.80 |
| 20 | 137.0835 | 1.0663 | | |
| 21 | 273.0431 | 0.8000 | 1.80420 | 46.50 |
| 22 | 32.0535 | 2.0185 | 1.88300 | 40.80 |
| 23 | 68.0309 | 2.9136 | | |
| 24ASPH | −21.2856 | 0.8000 | 1.88202 | 37.22 |
| 25ASPH | −121.9508 | 0.2000 | | |
| 26ASPH | 26.5838 | 4.3812 | 1.49710 | 81.56 |
| 27 | −16.9039 | d(27) | | |
| 28 | 77.0646 | 0.8000 | 1.92119 | 23.96 |
| 29 | 31.4500 | d(29) | | |
| 30 | 44.9520 | 4.0904 | 1.75211 | 25.05 |
| 31 | −49.3023 | 0.4011 | | |
| 32 | −51.1314 | 1.0000 | 1.88300 | 40.80 |
| 33 | 175.4727 | d(33) | | |
| 34 | ∞ | 2.0000 | 1.51680 | 64.20 |
| 35 | ∞ | 1.0000 | | |
| Image plane | ∞ | | | |

[Specification table]

| | Wide-angle end | Intermediate | Telephoto end |
|---|---|---|---|
| f | 12.3910 | 29.9969 | 48.5427 |
| FNo. | 4.0970 | 4.0996 | 4.0994 |
| ω | 51.9472 | 25.8372 | 16.5590 |
| Y | 13.9319 | 14.2000 | 14.2000 |

[Variable distance]

| | Wide-angle end | Intermediate | Telephoto end | Wide-angle end | Intermediate | Telephoto end |
|---|---|---|---|---|---|---|
| d(0) | ∞ | ∞ | ∞ | 201.9483 | 196.3433 | 168.1080 |
| d(2) | 1.0000 | 18.7257 | 38.5878 | 1.0000 | 18.7257 | 38.5878 |
| d(11) | 36.0687 | 6.9759 | 1.3000 | 36.0687 | 6.9759 | 1.3000 |
| d(27) | 1.5475 | 5.4714 | 4.6132 | 2.3344 | 8.5287 | 10.5943 |
| d(29) | 9.0915 | 7.3312 | 13.5389 | 8.3046 | 4.2738 | 7.5577 |
| d(33) | 12.5002 | 27.3088 | 36.0084 | 12.5002 | 27.3088 | 36.0084 |

[Lens group data]

| Group | Focal length |
|---|---|
| G1 | 140.9930 |
| G2 | −17.6771 |

-continued

|  |  |
|---|---|
| G3 | 28.0894 |
| G4 | -58.1687 |
| G5 | 97.2642 |

[Aspherical coefficient]

| Surface number | k | A4 | A6 | A8 | A10 | A12 |
|---|---|---|---|---|---|---|
| 5 | 0.0000 | 1.34853E−05 | 2.50321E−08 | 1.08908E−09 | −9.76278E−12 | 0.00000E+00 |
| 6 | 0.0000 | −1.99148E−05 | −1.11313E−07 | 2.58898E−09 | −2.62678E−11 | 0.00000E+00 |
| 10 | 0.0000 | 1.98525E−05 | 7.19009E−08 | 1.16057E−10 | 1.75533E−12 | 0.00000E+00 |
| 24 | 0.0000 | 1.11784E−05 | −2.95173E−07 | 2.52631E−09 | −2.46151E−11 | 8.75845E−14 |
| 25 | 0.0000 | 8.16179E−05 | −1.88253E−07 | 2.81057E−09 | −1.84232E−11 | 0.00000E+00 |
| 26 | 0.0000 | −1.82918E−05 | −1.21185E−07 | 1.24164E−09 | −7.41193E−12 | 0.00000E+00 |

Example 4

(1) Optical Configuration

Figure 13:
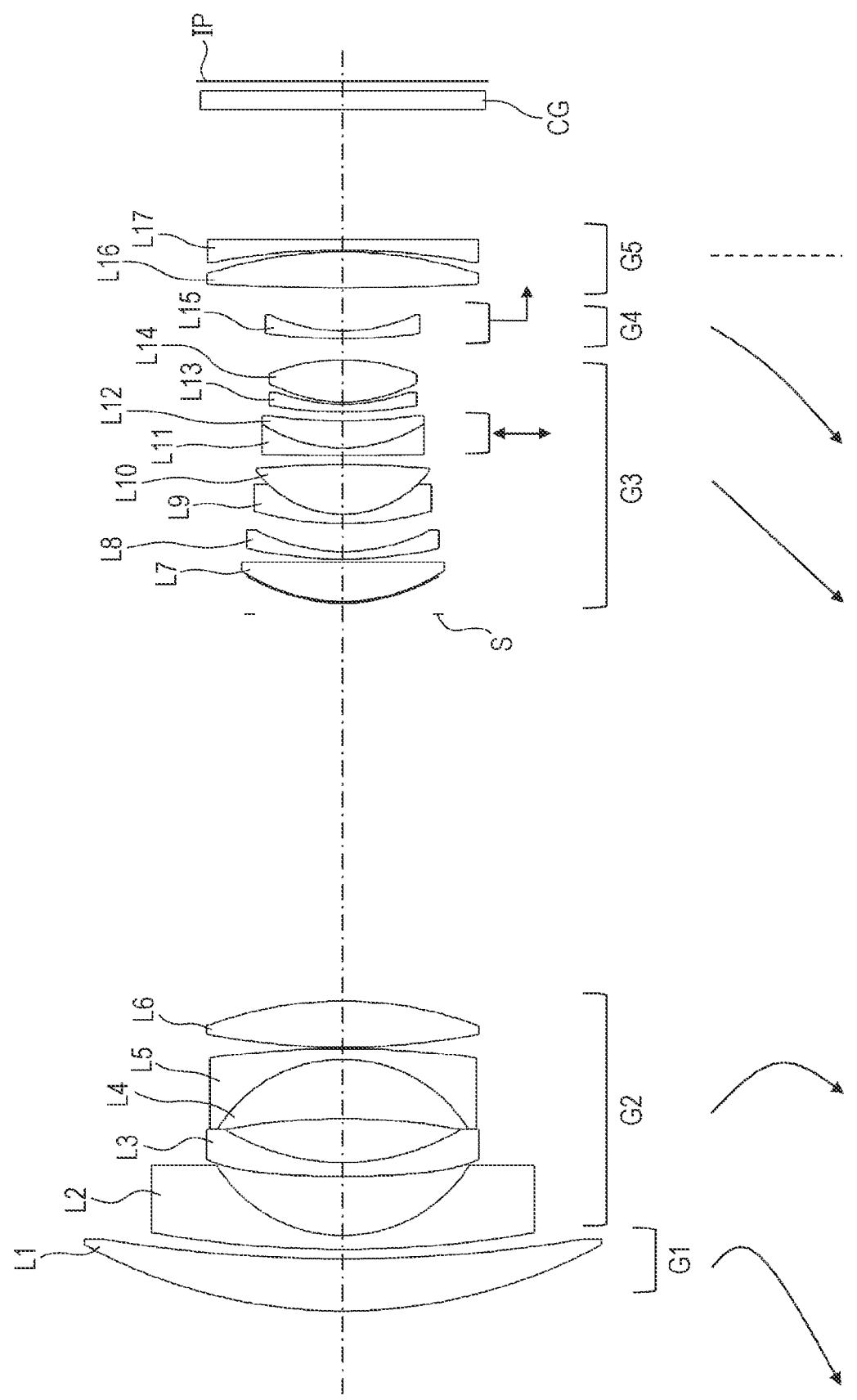
FIG. 13 illustrates a lens cross-sectional view of a zoom lens according to Example 4 at a wide-angle end.

FIG. 13 is a cross-sectional view of a zoom lens according to Example 4 of the present invention at the wide-angle end during infinity focus. The zoom lens comprises, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power. Hereinafter, a specific configuration of each lens group will be described.

The first lens group G1 comprises a positive meniscus lens L1 having a convex surface facing the object side.

The second lens group G2 includes, in order from the object side, a negative meniscus lens L2 having a convex surface facing the object side, a negative meniscus lens L3 having a convex surface facing the object side, a cemented lens in which a positive meniscus lens L4 having a concave surface facing the object side and a negative meniscus lens L5 having a concave surface facing the object side are cemented, and a biconvex lens L6. The negative meniscus lens L3 is a glass molded aspherical lens having aspherical shapes on both sides.

The third lens group G3 includes, in order from the object side, a positive meniscus lens L7 having a convex surface facing the object side, a negative meniscus lens L8 having a convex surface facing the object side, a cemented lens in which a negative meniscus lens L9 having a convex surface facing the object side and a biconvex lens L10 are cemented, a cemented lens in which a negative meniscus lens L11 having a convex surface facing the object side and a positive meniscus lens L12 having a convex surface facing the object side are cemented, a negative meniscus lens L13 having a convex surface facing the object side, and a biconvex lens L14. The positive meniscus lens L7 is a composite resin type aspherical lens in which a composite resin film molded in an aspherical shape is attached to an object side surface. The biconvex lens L14 is a glass molded aspherical lens having aspherical surfaces on both sides.

Further, in the third lens group G3, the cemented lens including the negative meniscus lens L11 and the positive meniscus lens L12 functions as the intermediate subgroup having negative refractive power described above, the object side subgroup having positive refractive power described above is closer to the object side than the intermediate subgroup, and the image side subgroup having positive refractive power described above is closer to the image side than the intermediate subgroup.

An aperture diaphragm S is disposed adjacent to the object side of the third lens group G3.

The fourth lens group G4 includes a negative meniscus lens L15 having a convex surface facing the object side.

The fifth lens group G5 includes, in order from the object side, a biconvex lens L16 and a concave flat lens L17 having a concave surface facing the object side.

When the magnification is changed from the wide-angle end to the telephoto end, the first lens group G1 moves along a path convex toward the image side, the second lens group G2 moves along a path convex toward the image side, the third lens group G3 moves toward the object side, the fourth lens group G4 moves toward the object side, and the fifth lens group G5 does not move and is fixed in the optical axis direction. The first lens group G1 is located closer to the object side at the telephoto end than at the wide-angle end, and the second lens group G2 is located closer to the image side at the telephoto end than at the wide-angle end.

When focusing from an infinity object to a short-distance object, the entire fourth lens group G4 becomes a focusing group and moves to the image side.

Furthermore, at the time of blur correction, the intermediate subgroup including the negative meniscus lens L11 and the positive meniscus lens L12 is moved in the direction perpendicular to the optical axis as a vibration-compensation group.

(2) Numerical Value Examples

Figure 14:
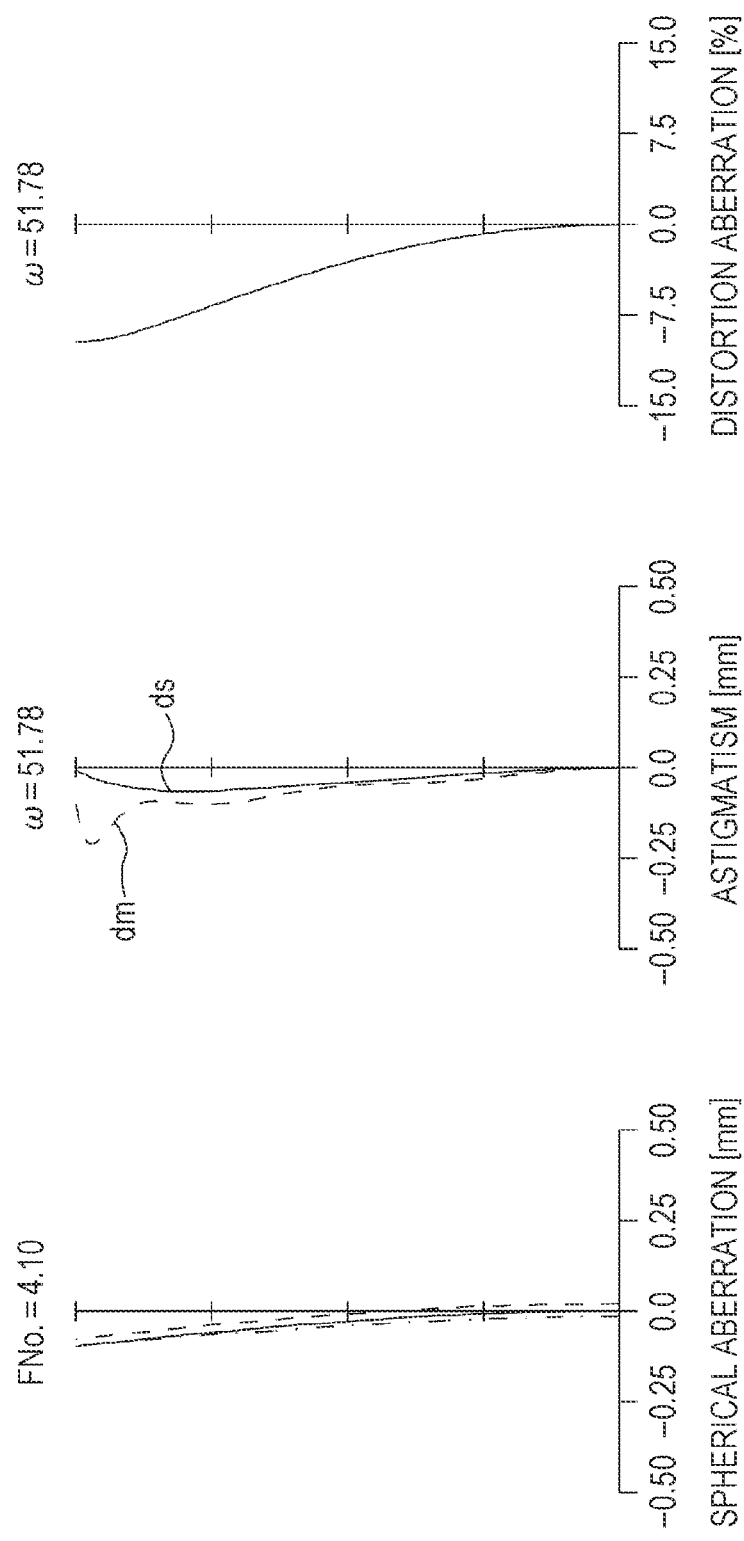
FIG. 14 illustrates aberration diagrams of the zoom lens according to Example 4 at the wide-angle end during infinity focus.
Figure 15:
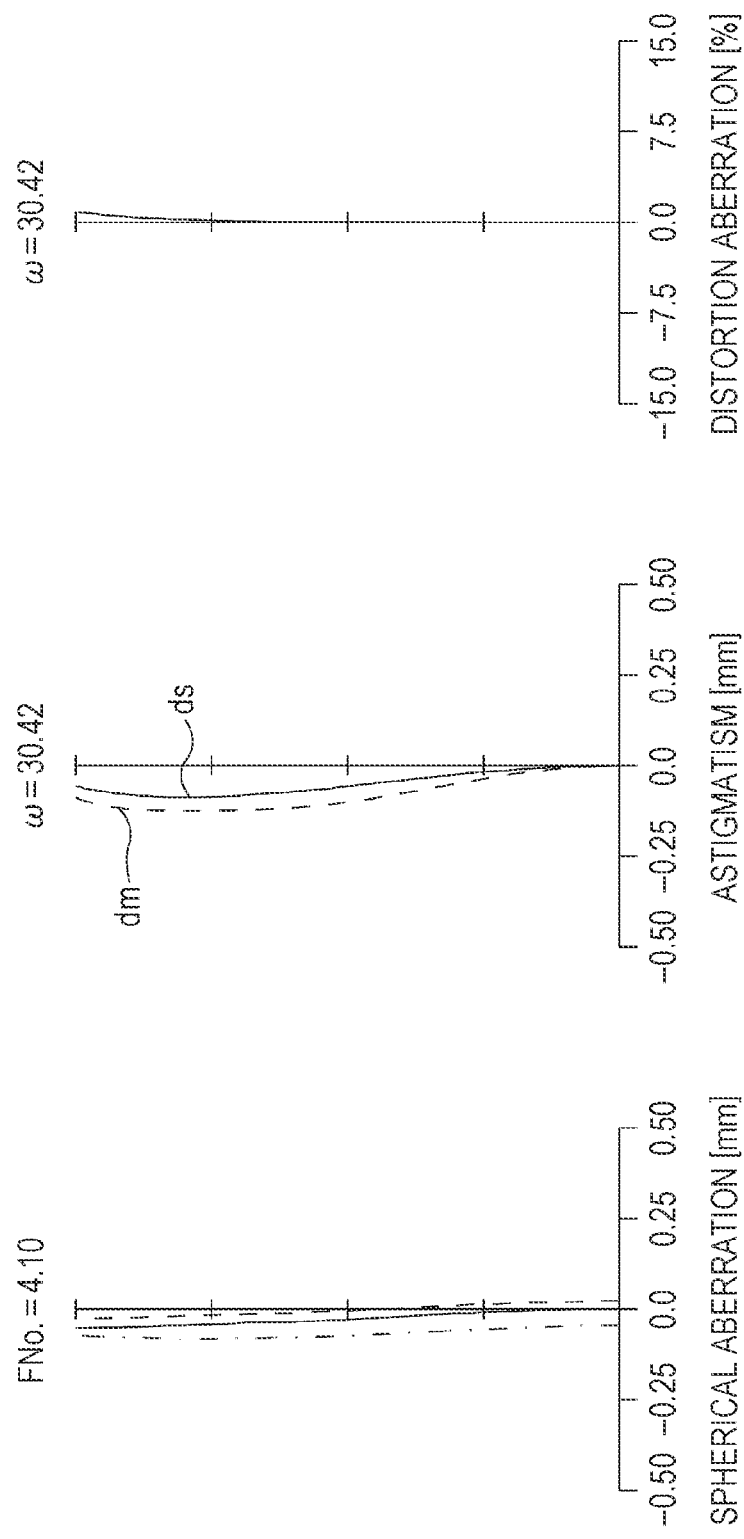
FIG. 15 illustrates aberration diagrams of the zoom lens according to Example 4 at an intermediate focal length during infinity focus.
Figure 16:
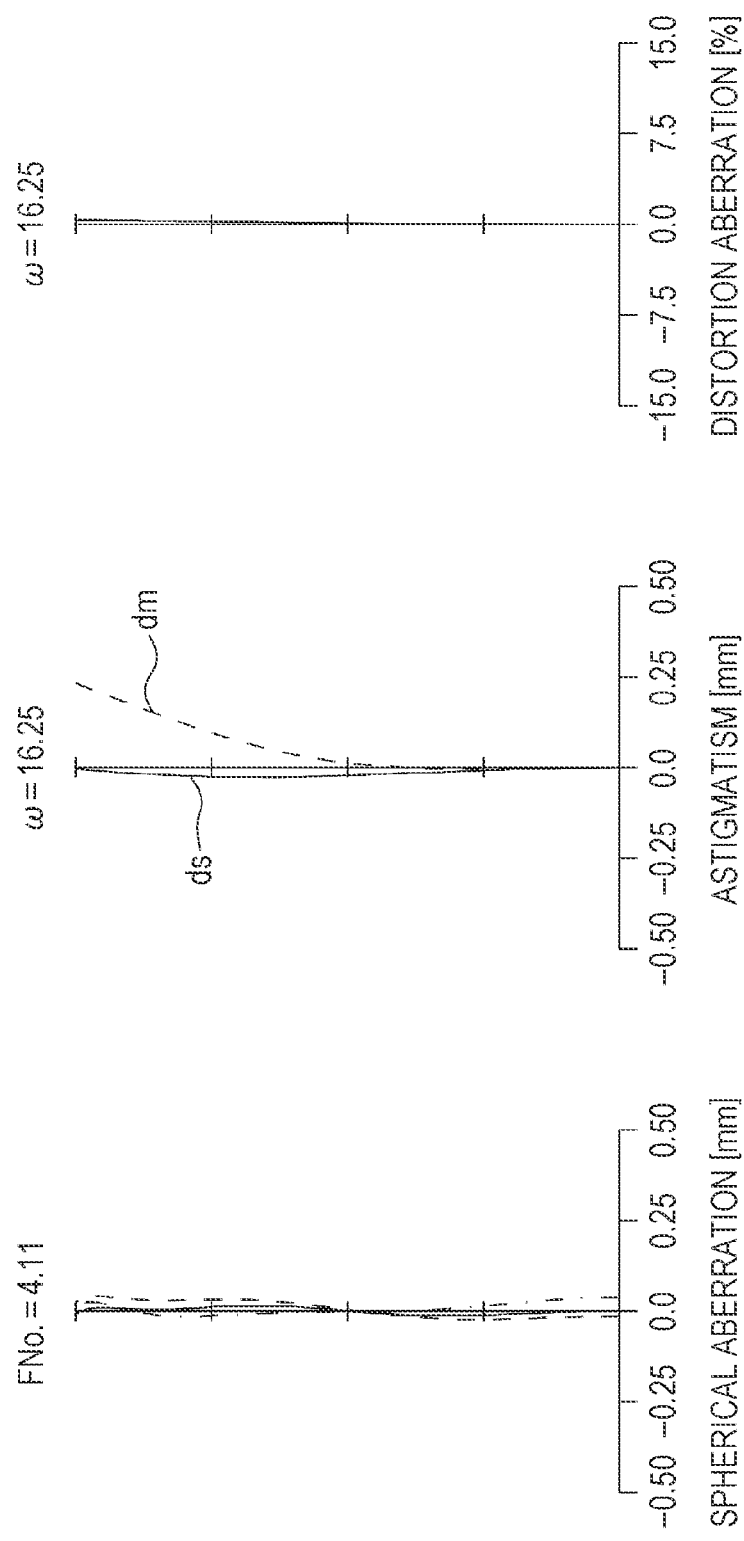
FIG. 16 illustrates aberration diagrams of the zoom lens of Example 4 at a telephoto end during infinity focus.

Next, numerical value examples to which specific numerical values of the zoom lens are applied will be described. Hereinafter, "lens data", "specification table", "variable distance", "lens group data", and "aspherical coefficient" are illustrated. Further, FIGS. 14 to 16 illustrate longitudinal aberration diagrams of the zoom lens at the wide-angle end, the intermediate focal length, and the telephoto end during infinity focus.

[Lens data]

| Surface number | r | d | nd | vd |
|---|---|---|---|---|
| Object surface | ∞ | d(0) | | |
| 1 | 58.0348 | 5.5629 | 1.69680 | 55.46 |

-continued

| | | | | | |
|---|---|---|---|---|---|
| 2 | 159.1627 | d(2) | | | |
| 3 | 117.9825 | 1.5000 | 1.90043 | 37.37 | |
| 4 | 16.0000 | 6.3446 | | | |
| 5ASPH | 132.0846 | 1.5000 | 1.72903 | 54.04 | |
| 6ASPH | 23.9921 | 4.7084 | | | |
| 7 | −69.3348 | 6.3799 | 1.67270 | 32.10 | |
| 8 | −15.8218 | 1.1000 | 1.88300 | 40.80 | |
| 9 | −110.3309 | 0.2000 | | | |
| 10 | 77.9296 | 4.9637 | 1.73800 | 32.33 | |
| 11 | −40.9345 | d(11) | | | |
| 12S | ∞ | 1.2000 | | | |
| 13ASPH | 18.6945 | 0.1500 | 1.53610 | 41.21 | |
| 14 | 19.4342 | 4.2435 | 1.74320 | 49.34 | |
| 15 | 7385.2784 | 0.3382 | | | |
| 16 | 48.3712 | 0.8000 | 1.48749 | 70.44 | |
| 17 | 20.3795 | 3.0000 | | | |
| 18 | 34.7731 | 1.0000 | 1.90366 | 31.31 | |
| 19 | 11.5994 | 5.3297 | 1.61800 | 63.39 | |
| 20 | −108.4899 | 1.0000 | | | |
| 21 | 522.6466 | 0.8000 | 1.85478 | 24.80 | |
| 22 | 16.0246 | 2.8783 | 1.92286 | 20.88 | |
| 23 | 50.2088 | 1.0372 | | | |
| 24 | 52.8829 | 0.8000 | 1.87070 | 40.73 | |
| 25 | 20.8928 | 0.2000 | | | |
| 26ASPH | 14.8942 | 4.5590 | 1.49710 | 81.56 | |
| 27ASPH | −21.5411 | d(27) | | | |
| 28 | 68.0850 | 0.8000 | 1.88300 | 40.80 | |
| 29 | 18.7473 | d(29) | | | |
| 30 | 271.6266 | 3.8186 | 1.92119 | 23.96 | |
| 31 | −46.5626 | 0.2000 | | | |
| 32 | −75.8071 | 1.1000 | 1.88300 | 40.80 | |
| 33 | ∞ | d(33) | | | |
| 34 | ∞ | 2.0000 | 1.51680 | 64.20 | |
| 35 | ∞ | 1.0000 | | | |
| Image plane | ∞ | | | | |

[Specification table]

| | Wide-angle end | Intermediate | Telephoto end |
|---|---|---|---|
| f | 12.4019 | 23.9981 | 48.4945 |
| FNo. | 4.1035 | 4.1012 | 4.1090 |
| ω | 51.7764 | 30.4189 | 16.2511 |
| Y | 14.2000 | 14.2000 | 14.2000 |

[Variable distance]

| | Wide-angle end | Intermediate | Telephoto end | Wide-angle end | Intermediate | Telephoto end |
|---|---|---|---|---|---|---|
| d(0) | ∞ | ∞ | ∞ | 263.0000 | 269.3034 | 244.3155 |
| d(2) | 1.0113 | 16.3446 | 33.9572 | 1.0118 | 16.3446 | 33.9572 |
| d(11) | 41.5282 | 14.7448 | 1.8000 | 41.5282 | 14.7448 | 1.8000 |
| d(27) | 2.2958 | 3.1451 | 2.3030 | 2.5930 | 3.8534 | 3.7792 |
| d(29) | 4.6503 | 13.9480 | 35.1102 | 4.3531 | 13.2397 | 33.6340 |
| d(33) | 14.0000 | 14.0000 | 14.0000 | 14.0000 | 14.0000 | 14.0000 |

[Lens group data]

| Group | Focal length |
|---|---|
| G1 | 128.1880 |
| G2 | −22.6721 |
| G3 | 24.7853 |
| G4 | −29.5233 |
| G5 | 86.7596 |

[Aspherical coefficient]

| Surface number | k | A4 | A6 | A8 | A10 | A12 |
|---|---|---|---|---|---|---|
| 5 | 0.0000 | 2.03159E−05 | −2.39919E−08 | 7.97194E−11 | 3.47173E−13 | 6.46836E−18 |
| 6 | −2.0162 | 1.88379E−05 | 1.13900E−08 | −7.93994E−10 | 5.97517E−12 | −1.50433E−14 |
| 13 | −0.4690 | −8.62573E−06 | −3.36271E−08 | 2.57615E−10 | −2.86313E−12 | 1.06641E−14 |
| 26 | −1.9480 | 6.93843E−06 | −3.58398E−08 | −1.52748E−09 | 4.49958E−12 | 2.74031E−13 |
| 27 | −0.1080 | 4.30106E−06 | 2.14973E−08 | −5.45269E−09 | 5.18311E−11 | 0.00000E+00 |

-continued

[Conditional expression corresponding value]

|  | Example 1 | Example 2 | Example 3 | Example 4 |
|---|---|---|---|---|
| Conditional expression (1) f1/fw | 12.126 | 11.811 | 11.379 | 10.336 |
| Conditional expression (2) f2/fw | −1.863 | −1.801 | −1.427 | −1.828 |
| Conditional expression (3) β2 t/β2w | 1.455 | 1.466 | 1.469 | 1.471 |
| Conditional expression (4) Rf/fw | 5.240 | 5.620 | 4.553 | 4.680 |
| Conditional expression (5) (Rf − Rb)/(Rf + Rb) | −0.525 | −0.472 | −0.494 | −0.466 |
| Conditional expression (6) β4 t/β4w | 1.500 | 1.489 | 1.651 | 1.524 |
| Conditional expression (7) f3 n/ft | −1.324 | −2.462 | −2.752 | −1.673 |
| Conditional expression (8) f3/fw | 2.067 | 2.166 | 2.267 | 1.999 |

|  | Example 1 | Example 2 | Example 3 | Example 4 |
|---|---|---|---|---|
| β2t | −0.270 | −0.269 | −0.220 | −0.324 |
| β2w | −0.186 | −0.184 | −0.150 | −0.220 |
| Rf | 65.002 | 69.649 | 56.413 | 58.035 |
| Rb | 208.667 | 193.948 | 166.585 | 159.163 |
| β4t | 2.758 | 2.543 | 2.568 | 2.987 |
| β4w | 1.338 | 1.707 | 1.555 | 1.960 |
| f3n | −64.221 | −119.375 | −133.569 | −81.138 |

According to the present invention, a zoom lens according to the present invention can provide a zoom lens that achieves both a wide angle of view at which a field angle of view exceeds 100° and a high magnification ratio, and has high imaging performance while being manufacturable at low cost, and an imaging apparatus including the zoom lens.

What is claimed is:

1. A zoom lens comprising:
in order from an object side,
a first lens group having positive refractive power;
a second lens group having negative refractive power;
a third lens group having positive refractive power;
a fourth lens group having negative refractive power; and
a fifth lens group having positive refractive power,
wherein
distances between the respective lens groups are changed to change magnification,
the first lens group consists of one single lens having spherical surfaces on both sides,
the single lens is a positive meniscus lens having a convex shape toward an object side,
the first lens group is different from a cemented lens,
at a time of magnification change from a wide-angle end to a telephoto end, the second lens group moves along a path convex toward an image side, and
following conditional expressions are satisfied:

$$8.0 \leq f1/fw \leq 14.0 \quad (1)$$

$$-2.5 \leq f2/fw \leq -1.2 \quad (2)$$

where
f1 is a focal length of the first lens group,
f2 is a focal length of the second lens group, and
fw is a focal length of the zoom lens at the wide-angle end.

2. The zoom lens according to claim 1, wherein at the time of magnification change from the wide-angle end to the telephoto end, the fifth lens group is fixed in an optical axis direction.

3. The zoom lens according to claim 1, wherein at the time of magnification change from the wide-angle end to the telephoto end, the first lens group moves along a path convex toward the image side, and is located closer to the object side at the telephoto end than at the wide-angle end.

4. The zoom lens according to claim 1, wherein when focusing on a short-distance object from a point at infinity, the fourth lens group moves to the image side.

5. The zoom lens according to claim 1, wherein a following conditional expression is satisfied:

$$1.3 \leq \beta2t/\beta2w \leq 2.0 \quad (3)$$

where
β2t is a lateral magnification of the second lens group at the telephoto end, and
β2w is a lateral magnification of the second lens group at the wide-angle end.

6. The zoom lens according to claim 1, wherein a following conditional expression is satisfied:

$$3.8 \leq Rf/fw \leq 8.0 \quad (4)$$

where
Rf is a radius of curvature of the single lens constituting the first lens group on the object side.

7. The zoom lens according to claim 1, wherein a following conditional expression is satisfied:

$$-0.8 \leq (Rf-Rb)/(Rf+Rb) \leq -0.35 \quad (5)$$

where
Rf is a radius of curvature of the single lens constituting the first lens group on the object side, and
Rb is a radius of curvature of the single lens constituting the first lens group on the image side.

8. The zoom lens according to claim 1, wherein a following conditional expression is satisfied:

$$1.3 \leq \beta4t/\beta4w \leq 2.2 \quad (6)$$

where
β4t is a lateral magnification of the fourth lens group at the telephoto end, and
β4w is a lateral magnification of the fourth lens group at the wide-angle end.

9. The zoom lens according to claim 1, wherein
the third lens group comprises, in order from the object side, a front subgroup having positive refractive power, an intermediate subgroup having negative refractive power, and a rear subgroup having positive refractive power, and
the intermediate subgroup is moved in a direction perpendicular to an optical axis to move an image.

10. The zoom lens according to claim 9, wherein a following conditional expression is satisfied:

$$-5.0 \leq f3n/ft \leq -0.8 \quad (7)$$

where
f3n is a focal length of the intermediate subgroup, and
ft is a focal length of the zoom lens at the telephoto end.

11. The zoom lens according to claim 1, wherein a following conditional expression is satisfied:

$$1.5 \leq f3/fw \leq 2.8 \quad (8)$$

where
f3 is a focal length of the third lens group.

12. The zoom lens according to claim 1, wherein the second lens group includes, in order from the object side, a first negative meniscus lens having a convex surface facing the object side and a second negative meniscus lens having a convex surface facing the object side.

13. An imaging apparatus comprising:
the zoom lens according to claim 1; and
an image sensor that converts an optical image formed on an image side of the zoom lens by the zoom lens into an electrical signal.

* * * * *